US011397558B2

(12) United States Patent
Mukherjee

(10) Patent No.: US 11,397,558 B2
(45) Date of Patent: Jul. 26, 2022

(54) OPTIMIZING DISPLAY ENGAGEMENT IN ACTION AUTOMATION

(71) Applicant: PELOTON INTERACTIVE, INC., New York, NY (US)

(72) Inventor: Rajat Mukherjee, San Jose, CA (US)

(73) Assignee: PELOTON INTERACTIVE, INC., New York, NY (US)

( * ) Notice: Subject to any disclaimer, the term of this patent is extended or adjusted under 35 U.S.C. 154(b) by 0 days.

(21) Appl. No.: 15/935,992

(22) Filed: Mar. 26, 2018

(65) Prior Publication Data

US 2018/0336010 A1 Nov. 22, 2018

Related U.S. Application Data

(60) Provisional application No. 62/576,766, filed on Oct. 25, 2017, provisional application No. 62/539,866, (Continued)

(51) Int. Cl.
*G06F 3/16* (2006.01)
*G06F 3/0484* (2013.01)
(Continued)

(52) U.S. Cl.
CPC ............ *G06F 3/167* (2013.01); *G06F 3/0484* (2013.01); *G06F 9/45512* (2013.01); *G06F 9/541* (2013.01); *G10L 15/22* (2013.01); *G10L 15/30* (2013.01); *H04L 12/2816* (2013.01); *H04L 67/141* (2013.01); *H04W 76/14* (2018.02);
(Continued)

(58) Field of Classification Search
CPC ......... G06F 3/048; G06F 3/0484; G06F 3/167
See application file for complete search history.

(56) References Cited

U.S. PATENT DOCUMENTS 5,873,064 A 2/1999 De Armas et al.
6,125,347 A 9/2000 Cote et al.
(Continued)

FOREIGN PATENT DOCUMENTS

EP 2 386 975 A2 11/2011

OTHER PUBLICATIONS

Sarikaya, Ruhi "The Technology Behind Personal digital Assistants" IEEE, Jan. 2017 (Year: 2017).*
(Continued)

*Primary Examiner* — Stephen S Hong
*Assistant Examiner* — Nicholas Hasty
(74) *Attorney, Agent, or Firm* — AMPACC Law Group, PLLC

(57) ABSTRACT

Embodiments of the present invention provide systems, methods, and computer storage media directed to optimizing engagement with a display during digital assistant-performed operations in response to a received command. The digital assistant generates an overlay having user interface elements that present information determined to be relevant to a user based on the received command and contextual data. The overlay is presented over the underlying operations performed on corresponding applications to mask the visible steps of the operations being performed. In this way, the digital assistant optimizes display resources that are typically rendered useless during the processing of digital assistant-performed operations.

20 Claims, 16 Drawing Sheets

Related U.S. Application Data filed on Aug. 1, 2017, provisional application No. 62/576,804, filed on Oct. 25, 2017, provisional application No. 62/509,534, filed on May 22, 2017, provisional application No. 62/508,181, filed on May 18, 2017.

(51) Int. Cl.

| | | |
|---|---|---|
| *G06F 3/048* | (2013.01) | |
| *G06F 9/455* | (2018.01) | |
| *G06F 9/54* | (2006.01) | |
| *H04W 76/14* | (2018.01) | |
| *G10L 15/22* | (2006.01) | |
| *G10L 15/30* | (2013.01) | |
| *G10L 15/26* | (2006.01) | |
| *H04L 12/28* | (2006.01) | |
| *H04L 29/08* | (2006.01) | |
| *H04L 67/141* | (2022.01) | |
| *H04L 67/306* | (2022.01) | |

(52) U.S. Cl.
CPC ............. *G06F 3/048* (2013.01); *G10L 15/26* (2013.01); *G10L 2015/223* (2013.01); *H04L 67/306* (2013.01)

(56) References Cited

U.S. PATENT DOCUMENTS

| | | | |
|---|---|---|---|
| 6,188,976 | B1 | 2/2001 | Ramaswamy et al. |
| 7,747,593 | B2 | 6/2010 | Patterson et al. |
| 8,620,842 | B1 | 12/2013 | Cormack |
| 8,805,766 | B2 | 8/2014 | Ray |
| 8,805,845 | B1 | 8/2014 | Li et al. |
| 9,002,848 | B1 | 4/2015 | Peng et al. |
| 9,280,610 | B2 | 3/2016 | Gruber et al. |
| 9,619,468 | B2 | 4/2017 | Adams et al. |
| 9,633,004 | B2 | 4/2017 | Giuli et al. |
| 9,966,065 | B2 | 5/2018 | Gruber et al. |
| 9,972,304 | B2 | 5/2018 | Paulik et al. |
| 10,176,171 | B1 | 1/2019 | Patterson et al. |
| 10,180,929 | B1 | 1/2019 | Kesin et al. |
| 10,394,864 | B2 | 8/2019 | Lee et al. |
| 10,402,470 | B2 * | 9/2019 | Esterly ................... G06F 3/048 |
| 10,698,654 | B2 | 6/2020 | Loughrey et al. |
| 2002/0065857 | A1 | 5/2002 | Michalewicz et al. |
| 2002/0078091 | A1 | 6/2002 | Vu et al. |
| 2002/0161763 | A1 | 10/2002 | Ye et al. |
| 2004/0111438 | A1 | 6/2004 | Chitrapura et al. |
| 2004/0241633 | A1 | 12/2004 | Drozda et al. |
| 2005/0102301 | A1 | 5/2005 | Flanagan |
| 2005/0114161 | A1 | 5/2005 | Garg et al. |
| 2006/0004747 | A1 | 1/2006 | Weare |
| 2006/0136221 | A1 * | 6/2006 | James ................... G10L 15/265 |
| | | | 704/275 |
| 2006/0167930 | A1 | 7/2006 | Witwer et al. |
| 2007/0112755 | A1 | 5/2007 | Thompson et al. |
| 2007/0271292 | A1 | 11/2007 | Acharya et al. |
| 2008/0201306 | A1 | 8/2008 | Cooper et al. |
| 2009/0070312 | A1 | 3/2009 | Patterson |
| 2009/0094233 | A1 | 4/2009 | Marvit et al. |
| 2009/0164416 | A1 | 6/2009 | Guha |
| 2009/0254336 | A1 | 10/2009 | Dumais et al. |
| 2009/0287668 | A1 | 11/2009 | Evans et al. |
| 2011/0111741 | A1 | 5/2011 | Connors et al. |
| 2011/0273625 | A1 | 11/2011 | McMahon et al. |
| 2011/0289067 | A1 | 11/2011 | Jordan et al. |
| 2012/0102121 | A1 | 4/2012 | Wu et al. |
| 2012/0109946 | A1 | 5/2012 | Qian |
| 2012/0124044 | A1 | 5/2012 | Bhattacharya et al. |
| 2012/0290933 | A1 | 11/2012 | Rajaraman et al. |
| 2013/0013644 | A1 | 1/2013 | Sathish et al. |
| 2013/0138641 | A1 | 5/2013 | Korolev et al. |
| 2013/0159313 | A1 | 6/2013 | Jakubik |
| 2013/0179423 | A1 | 7/2013 | Gur et al. |
| 2013/0314438 | A1 | 11/2013 | Borcherdt |
| 2014/0006406 | A1 | 1/2014 | Kafati et al. |
| 2014/0156282 | A1 | 6/2014 | Madere et al. |
| 2014/0244254 | A1 | 8/2014 | Ju et al. |
| 2014/0278413 | A1 | 9/2014 | Pitschel et al. |
| 2015/0040008 | A1 * | 2/2015 | Redenshek ........... G01R 33/443 |
| | | | 715/719 |
| 2015/0180967 | A1 | 6/2015 | Takagishi |
| 2015/0199417 | A1 | 7/2015 | Ashparie et al. |
| 2015/0356174 | A1 | 12/2015 | Narayana et al. |
| 2015/0373183 | A1 | 12/2015 | Woolsey et al. |
| 2016/0012818 | A1 | 1/2016 | Faizakof et al. |
| 2016/0019471 | A1 | 1/2016 | Shin et al. |
| 2016/0027399 | A1 | 1/2016 | Wilde et al. |
| 2016/0050160 | A1 | 2/2016 | Li et al. |
| 2016/0132290 | A1 | 5/2016 | Raux |
| 2016/0132482 | A1 | 5/2016 | Salome et al. |
| 2016/0162456 | A1 | 6/2016 | Munro et al. |
| 2016/0171764 | A1 | 6/2016 | Chew et al. |
| 2016/0173578 | A1 | 6/2016 | Sharma et al. |
| 2016/0179787 | A1 | 6/2016 | Deleeuw |
| 2016/0212488 | A1 | 7/2016 | Os et al. |
| 2016/0225370 | A1 | 8/2016 | Kannan et al. |
| 2016/0260430 | A1 | 9/2016 | Panemangalore et al. |
| 2016/0381287 | A1 * | 12/2016 | Sirpal .................. G06F 3/0481 |
| | | | 348/333.02 |
| 2017/0061956 | A1 | 3/2017 | Sarikaya et al. |
| 2017/0205854 | A1 | 7/2017 | Zenoff |
| 2017/0235820 | A1 | 8/2017 | Conrad et al. |
| 2018/0032606 | A1 | 2/2018 | Tolman et al. |
| 2018/0144046 | A1 | 5/2018 | Braga et al. |
| 2019/0287512 | A1 | 9/2019 | Zoller et al. |

OTHER PUBLICATIONS

Fuckner, Marcio "Using a Personal Assistant for Exploiting Service Interfaces" 2014 IEEE, p. 89-94 (Year: 2014).*
International Search Report and Written Opinion dated Aug. 9, 2018 in International Patent Application No. PCT/US18/33453, 9 pages.
International Preliminary Report on Patentability dated Sep. 30, 2019 in International Patent Application No. PCT/US2018/033453, 11 pages.
"Link Mobile Device with Smart Home Assistant", retrieved May 22, 2017, p. 1.
"The Q System", Aiqudo Inc. Confidential, retrieved Oct. 25, 2017, p. 3.
"The Q App and Action Kit", Aiqudo, Inc. Confidential, retrieved Oct. 25, 2017, p. 5.
"Q Commands", Aiqudo, Inc. Confidential, retrieved Oct. 25, 2017, p. 4.
Chowdhury, S. A., et al., "Cross-language transfer of semantic annotation via targeted crowdsourcing", Annual Conference of the International Speech Communication Association, pp. 2108-2112 (Sep. 14-18, 2014).
Campagna, G., et al., "Almond: The architecture of an open, crowdsourced, privacy-preserving, programmable virtua assistant". Proceedings of the 26th International Conference on World Wide Web, pp. 341-350 (Apr. 3-7, 2017).
Jabaian, B., et al., "Investigating multiple approaches for slu portability to a new language", International Speech Communication Association, pp. 2502-2505 (Sep. 26-30, 2010).
Su, Y., et al., "Building natural language interfaces to web Apis", ACM on Conference on information and Knowledge Management, pp. 1-10 (Nov. 2017).
International Search Report and Written Opinion dated Jul. 26, 2018 in International Patent Application No. PCT/US2018/033342, 9 pages.
Non-Final Office Action dated Sep. 19, 2018, in U.S. Appl. No. 15/935,983, 16 pages.
Final Office Action dated Apr. 2, 2019, in U.S. Appl. No. 15/935,983, 16 pages.
International Search Report and Written Opinion dated Jun. 14, 2019 in International Patent Application No. PCT/US2018/067936, 8 pages.

(56) References Cited

OTHER PUBLICATIONS

Non-Final Office Action dated Jul. 11, 2019, in U.S. Appl. No. 15/935,983, 17 pages.
International Preliminary Report On Patentability received for PCT Patent Application No. PCT/US2018/033342 dated an Aug. 23, 2019, 7 pages.
Notice of Allowance dated Sep. 25, 2019, in U.S. Appl. No. 15/935,983, 7 pages.
International Preliminary Report On Patentability received for PCT Patent Application No. PCT/US2018/067936, dated Jul. 9, 2020, 8 pages.
Non-Final Office Action dated Jul. 22, 2020, in U.S. Appl. No. 16/234,215, 14 pages.
Notice of Allowance dated Nov. 18, 2020, in U.S. Appl. No. 16/234,215, 7 pages.
Supplemental Notice of Allowability dated Feb. 1, 2021, in U.S. Appl. No. 16/234,215, 2 pages.
Extended European Search Report received for EP Patent Application No. 18802499.6, dated Apr. 9, 2021, 9 pages.

\* cited by examiner

OPTIMIZING DISPLAY ENGAGEMENT IN ACTION AUTOMATION

CROSS-REFERENCE TO RELATED APPLICATIONS

This application is related by subject matter to and claims the benefit of U.S. Provisional Patent Application No. 62/508,181, filed May 18, 2017, entitled "SYSTEMS AND METHODS FOR CROWDSOURCED ACTIONS AND COMMANDS," U.S. Provisional Patent Application No. 62/509,534, filed May 22, 2017, entitled "CONNECTING MULTIPLE MOBILE DEVICES TO A SMART HOME ASSISTANT ACCOUNT," U.S. Provisional Patent Application No. 62/576,804, filed Oct. 25, 2017, entitled "CONNECTING MULTIPLE MOBILE DEVICES TO A SMART HOME ASSISTANT ACCOUNT," U.S. Provisional Patent Application No. 62/539,866, filed Aug. 1, 2017, entitled "OPTIMIZING DISPLAY ENGAGEMENT IN ACTION AUTOMATION," and U.S. Provisional Patent Application No. 62/576,766, filed Oct. 25, 2017, entitled "A CROWDSOURCED DIGITAL ASSISTANT SYSTEM," which are incorporated herein by reference in their entirety.

BACKGROUND

Digital assistants have become ubiquitous in a variety of consumer electronic devices. Some modern day digital assistants employ speech recognition technologies to provide a conversational interface between users and electronic devices. These digital assistants can employ various algorithms, such as natural language processing, to improve interpretations of commands received from a user. Consumers have expressed various frustrations with conventional digital assistants due to privacy concerns, constant misinterpretations of spoken commands, unavailability of services due to weak signals or a lack of signal, and the general requirement that the consumer must structure their spoken commands in dialects that are unnatural.

Moreover, as the general pace of society continues to accelerate, so do users' desires to consume readily-available information. Digital assistants enable a seamless interface between users and their devices, and can provide a much faster means for the exchange of input and output information. One digital assistant, particularly the "Q" digital assistant developed by Aiqudo Inc., headquartered in San Jose, Calif., has integrated automation into the digital assistant. In other words, the "Q" digital assistant can, among many other things, perform a series of predefined tasks (e.g., "actions") based on a received command to accomplish a desired result.

SUMMARY

Embodiments of the present disclosure relate to resource optimization. More specifically, embodiments herein describe techniques that optimize display resources to engage users of computing devices while automated actions are executed thereon. By employing a digital assistant that facilitates the automation of a predefined action based on a received command, embodiments described herein conceal the performed steps associated with the automated action, utilizing a generated overlay that presents information determined to be relevant to the received command and/or obtained contextual data. In this way, as the steps of an automated action are performed by the computing device via the digital assistant, for a duration that generally leaves the computing device in abeyance, the digital assistant provides for display information that is determined to be relevant to the received command.

In an embodiment, a determination is made by a computing device, via a digital assistant, to execute an automated action based on a received command. An overlay interface is generated to include one or more user interface elements that are determined to have relevance to at least a portion of the received command. Relevance can be determined based on various types of contextual data obtained by the computing device, including any portion of the received command, among other things. The generated overlay interface is provided for display to mask at least a portion of the visual output data generated for display by one or more applications associated with the execution of the automated action. In this way, not only is the user discouraged from interfering with the automated actions as they are performed, but is provided with relevant and useful information on a display that would otherwise be unavailable until the automated action is fully executed. Upon completion of the automated action, the displayed overlay interface is removed from the display, and a resulting interface associated with the automated action is presented to the user.

In some further embodiments, the information determined relevant to the user is provided for display on the generated overlay interface to entice the user to explore the relevant information in more detail. In this regard, the result of the automated action is presented after the displayed overlay interface is removed, and a user interface element corresponding to the relevant information is presented on the display in addition to the result. Responsive to a received interaction with the user interface element, a subsequent action associated with the relevant information is executed to provide for display additional detail relating to the relevant information.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present disclosure is described in detail below with reference to the attached drawing figures, wherein.

DETAILED DESCRIPTION

Figure 1:
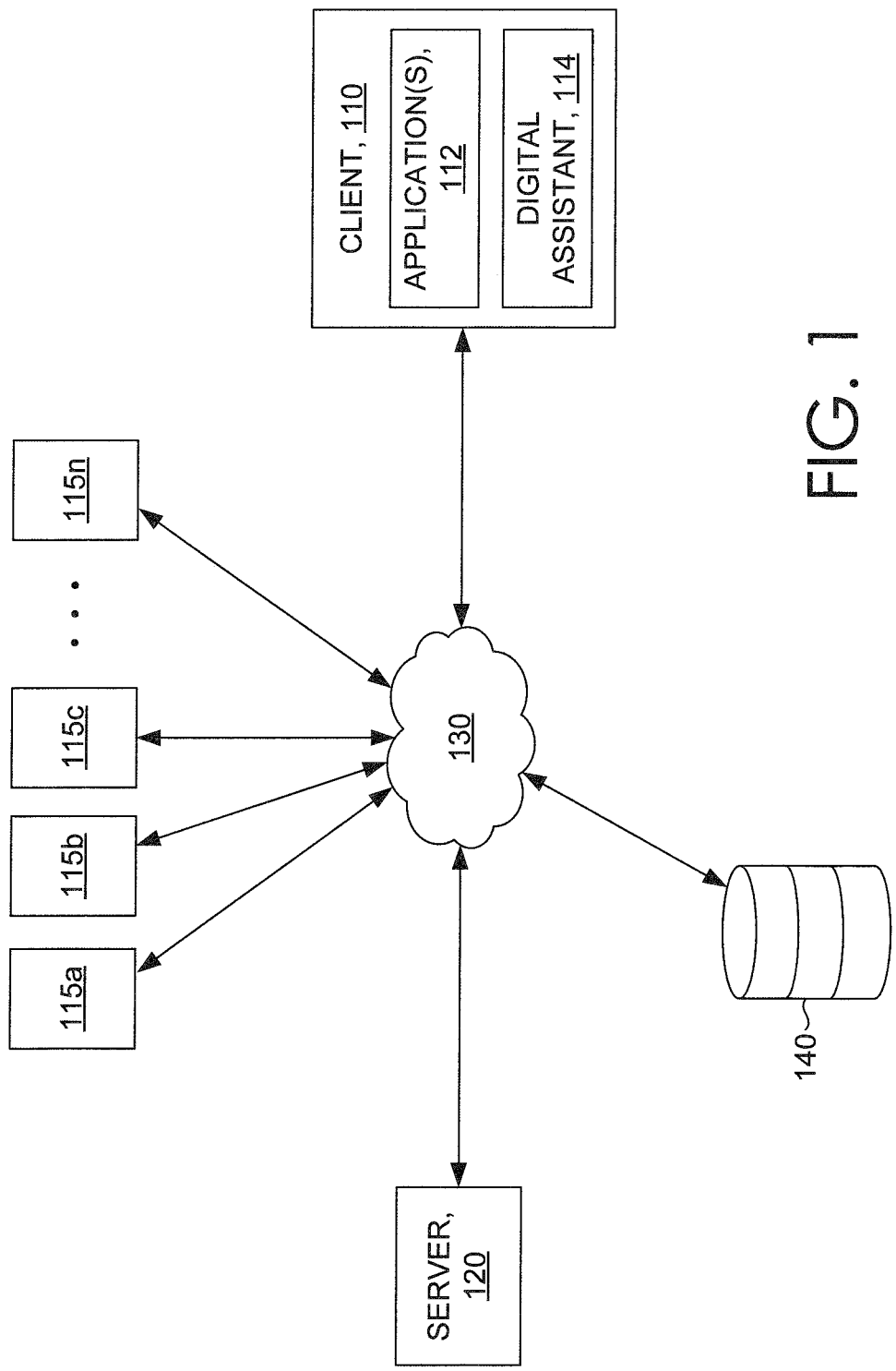
FIG. 1 depicts an exemplary operating environment in accordance with some embodiments of the present disclosure.

As electronic devices become more integrated into our daily lives, so do the methods in which we can interface with them. Digital assistants have found a place in many peoples' homes, providing voice-activated services that can assist users with various tasks, from a basic level to a very advanced level. However, conventional digital assistants are mostly limited to the capabilities that the service provider and their developers implement. Some service providers and developers provide an open interface (e.g., an API) such that third-parties can develop custom services that can essentially "plug in" to the digital assistant and provide additional services. Typically, these digital assistants are implemented into a stationary device or mobile phone, and activated by speech detection or manual activation (e.g., a button press). Once activated, the digital assists receive a voice command, and relay the command to a remote server of the service provider (or third-party service provider) for processing. The remote server can then provide a response or an acknowledgement of the received command to the digital assistant for output to the user.

For the most part, modern-day society has adopted the use of mobile computing devices, such as smart phones. Users generally prefer to carry portable computing devices on their person, having a readily-available resource for accessing information and providing a means for communication. Users can download and install applications of their choosing, and maintain settings that are customized to their personal preferences. The number of applications providing unique services to users is astounding, increasing by the thousands daily. In this regard, it is improbable to provide digital assistant services that can cater to the needs of all users, particularly based on the various services provided by the applications preferred and utilized by the users.

As such, a digital assistant having easily customizable commands and actions that can be performed by the digital assistant, based on the receipt of a command, solves the aforementioned problems. As briefly noted above, the "Q" digital assistant, developed by Aiqudo, Inc., headquartered in San Jose, Calif., has implemented customizable automation into the digital assistant. In other words, the "Q" digital assistant can, among many other things, perform a series of predefined tasks (e.g., "action") based on the receipt of a predefined input (e.g., "command") to accomplish a desired result. In addition, the "Q" digital assistant provides a plethora of additional services, such as crowd-sourced definitions of various commands and actions that are quality-assured by intelligent algorithms, essentially eliminating the need for a novice user to "train" their digital assistant to work with their preferred applications.

Among other things, the "Q" digital assistant receives a voice command and translates the speech to text. The digital assistant can then employ natural language processing to analyze the text for any recognized commands that may be serviced by applications already-installed or required-to-be-installed by the user. In some instances, the commands may include parameters that are recognized by the digital assistant as well. Provided that an application capable to service the command is installed on the user device, the "Q" assistant can then automate a series of predefined tasks, which can include, by way of example only: launching the application, emulating touch inputs for button presses or application navigation, passing parameters into application form fields, waiting for application or remotely-communicated responses, and many more, until the automated "action" is fully executed and the user is provided with a result of the provided command.

As described, when the automated action is being executed by the digital assistant, or in other words when the various steps associated with an automated action are being performed, the various steps required to complete the action are emulated by the digital assistant. In essence, and by way of example only, the user can provide a voice command to the digital assistant, such as "get me a ride to the airport," the digital assistant can determine that a particular application can provide this service, determine a current location of the user and a nearest airport, and launch a ridesharing application that the digital assistant can pass the "current location" and "airport" parameters to. Any additional inputs, such as a "submit" button can also be automated by the digital assistant provided that such tasks are included in the predefined action corresponding to the received command.

When the automated action is being executed by the digital assistant, the user is generally exposed to the steps being performed by the digital assistant. That is, the application(s) launched and the tasks performed by the digital assistant are visible to the user, as if they were being manually performed. During this time, precious display real estate could be utilized effectively. As was noted, digital assistants were created to provide a more efficient manner of receiving and providing information to users in a generally high-paced society. To this end, the resources available to the user could be utilized in a more efficient manner during the latency period associated with the execution of a digital assistant-invoked automated action. As such, embodiments of the present disclosure provide various techniques to optimize display engagement in action automation by, among other things, presenting useful information on a display while the automated action is being executed. In other words, information relevant to the user, based at least in part on the received command, can be provided on a mask that essentially hides the automated action as it is being performed. Among other things, the relevant information can provide additional information and/or additional commands that are semantically or contextually relevant to the action being performed, and in some instances, provide additional interactive elements that the user can selectively interact with to execute these additional commands.

In an embodiment, a command is received by a digital assistant of a computing device. The digital assistant determines one of a plurality of automated actions to execute on the computing device based at least in part on the received command. The digital assistant generates an overlay interface (e.g., a graphical user interface or GUI) that includes one or more user interface elements having content that is determined to have relevance to one or more terms in the received command. The generated overlay is provided for display to mask at least a portion, and preferably the entirety, of visual output data that was generated for display by the computing device or applications thereon as the automated action is being executed. In essence, the digital assistant will generate and present a masking overlay interface that covers a portion or an entirety of a display as the digital assistant is performing the automated tasks on one or more applications that correspond to the received command. The overlay interface is generated to include and present one or more pieces of relevant information that can be consumed by the user at the time of action execution. Among other things, the overlay interface can also mask the automated actions to present a cleaner, more seamless interface to the user.

In some further embodiments, the digital assistant removes the overlay interface from display upon or after the automated action is fully executed, revealing a resulting interface (e.g., GUI) that is also the last GUI the user would have seen had they performed all of the tasks manually. In some other embodiments, the resulting interface is the "home interface" (e.g., the main screen of the operating system), or the last GUI that was displayed to the user just before the digital assistant was activated to execute the automated action. It is also contemplated that the resulting interface is user-defined, such that any particular application interface or operating system interface is presented to the user upon completion of automated action execution.

In even further embodiments, another user interface element is generated by the digital assistant and provided for display based on the generated overlay interface being removed from the display. That is, after or upon a completed execution of the automated action, the digital assistant provides for display the other user interface element having content that is determined to be relevant to at least a portion of the content presented on the recently-removed overlay interface. In various embodiments, the other user interface element can be a banner, a floating "chat head," or any other user interface element that includes content relevant to the user. In some further embodiments, the user interface element can be interacted with, such that it can detect an interaction (e.g., a touch input). Responsive to the detected interaction, a corresponding action can be executed or another operation (e.g., opening a URL) can be performed to provide additional information that appealed to the user during execution of the recently-executed action. In this way, a great deal of time can be saved between various operations and/or actions a user wishes to perform on the computing device. Instead of waiting for a particular action to finish execution, the digital assistant provides relevant information during this downtime and can further provide an immediate segue way to access more detail or perform another action related to the provided information.

Turning now to FIG. 1, a schematic depiction is provided illustrating an exemplary system 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system in FIG. 1 includes one or more clients 110, 115*a*, 115*b*, 115*c*, . . . 115*n*, in communication with a server 120 via a network 130 (e.g., the Internet). In this example, the server 120, also in communication with the network 130, is in communication with each of the client devices 110, 115*a*-115*n*, and can also be in communication with a database 140. The database can be directly coupled to the server 120 or coupled to the server 120 via the network 130. The client device 110, representative of client devices 115*a*-115*n*, is a computing device comprising one or more applications 112 and a digital assistant 114 installed thereon. The following description in reference to FIG. 1 provides a high level overview of the "Q" digital assistant, described briefly herein above, with additional detail provided in U.S. Provisional Application No. 62/508,181, filed May 18, 2017, entitled "SYSTEMS AND METHODS FOR CROWD-SOURCED ACTIONS AND COMMANDS," and U.S. Provisional Application No. 62/509,534, filed May 22, 2017, entitled "CONNECTING MULTIPLE MOBILE DEVICES TO A SMART HOME ASSISTANT ACCOUNT."

The one or more applications 112 includes any application that is executable on the client 110, and can include applications installed via an application marketplace, custom applications, web applications, side-loaded applications, applications included in the operating system of the client 110, or any other application that can be reasonably considered to fit the general definition of an application. On the other hand, the digital assistant 114 can be an application, a service accessible via an application installed on the client 110 or via the network 130, or implemented into a layer of an operating system of the client 110. In accordance with embodiments described herein, the digital assistant 114 provides an interface between a client 110 and a user (not shown), generally via a speech-based exchanged, although any other method of exchange between user and client 110 remains within the purview of the present disclosure.

When voice commands are received by the digital assistant 114, the digital assistant converts the speech command to text, analyzes the command to extract relevant keywords and/or parameters, processes the keywords and/or parameters and/or any additional contextual data obtained by the client 110, identifying the command in a library of recognized commands and corresponding actions, and determining an appropriate action to perform on one or more applications 112 installed on the client 110.

By way of brief overview, a command can include one or more keywords and/or one or more parameters and parameter types, generally corresponding to a predefined action to be performed on one or more particular applications. Moreover, a plurality of commands can correspond to a single predefined action, such that there are multiple equivalent commands that can invoke the same predefined action. By way of example only, commands such as "check in," check into flight," "please check in," "check into flight now,"

"check in to flight 12345," and the like, can all invoke the same action that directs the digital assistant to open up an appropriate application and perform the predefined set of tasks to achieve the same result.

The aforementioned commands, however, may lack appropriate information (e.g., the specific airline). As one of ordinary skill may appreciate, a user may have multiple applications from various vendors associated with a similar service (e.g., airlines). While not described in detail herein, the referenced "Q" digital assistant provides features that can determine contextual information associated with the user, based on historical use of the digital assistant, stored profile information, stored parameters from previous interactions or commands, searches through email folders, and a variety of other types of information stored locally or remotely on a server, such as server 120, to identify an appropriate parameter and determine a complete command to invoke the appropriate action. More specific commands, such as "check into FriendlyAirline flight," or "FriendlyAirline check in," and the like, can be recognized by a digital assistant, such as the "Q" assistant, to invoke the appropriate action based on the complete command received thereby.

One or more recognizable commands and corresponding actions can be received by the digital assistant 114 from the server 120 at any time, including upon installation, initialization, or invocation of the digital assistant 114, after or upon receipt of the speech command by the digital assistant 114, after or upon installation of a new application, periodically (e.g., once a day), when pushed to the client 110 from the server 120, among many other configurations. It is contemplated that the commands and corresponding actions received by the client 110 are limited based at least in part on the applications 112 installed on the client 110, although configurations where a larger or smaller set of commands and actions can be received.

In the event a command and/or action is not available for a particular application installed on the client 110, digital assistant 114 can either redirect the user to a marketplace to install the appropriate application, or include a training feature that enables a user to manually perform tasks on one or more applications to achieve the desired result. The digital assistant 114 can also receive one or more commands from the user (e.g., via speech) to associate with the tasks manually performed or to be manually performed during training. In this way, the command is associated with at least the particular application designated by the user and also corresponds to the one or more tasks manually performed by the user, associating the received command to the task(s) and the desired result. In some instances, the server 120 can provide a command and/or action for the received command based on crowd-sourced commands and/or actions collected (e.g., submitted by or received from) client devices 115a-115n also independently having a digital assistant 114 and applications 112 installed thereon. The client devices 115a-115n may have any combination of applications 112 installed thereon, and any training of commands and actions performed on any client device 110, 115-115n can be communicated to the server 120 to be analyzed and stored for mass or selective deployment. Although not described in more detail herein, the server 120 can include various machine-learned algorithms to provide a level of quality assurance on user-trained commands and actions before they are distributed to other users via the network 130.

When the digital assistant 114 determines an appropriate action (e.g., one or more tasks to achieve a desired result) that corresponds to the received command, the digital assistant 114 generates an overlay interface that can mask any or all visual outputs associated with the determined action or the computing device generally. The generation of the overlay interface can include a selection, by the digital assistant 114, of one or more user interface elements that are stored in a memory of the client 110 or server 120, and/or include a dynamic generation of the user interface element (s) by the digital assistant 114 or server 120 based on one or more portions of the received command and/or contextual data (e.g., location data, user profile associated with the client 110 or digital assistant 114, historical data associated with the user profile, etc.) obtained by the client 110, digital assistant 114, and/or server 120. The selected or generated one or more user interface elements each includes content that is relevant to one or more portions (e.g., terms, keywords) of the received command. In the event of dynamic generation of user interface elements, such elements can be saved locally on the client 110 or remotely on the server 120 for subsequent retrieval by the client 110, or can be discarded and dynamically regenerated at any time.

The digital assistant 114 provides for display the generated overlay interface including the one or more user interface elements including relevant content to mask the automated tasks being performed (e.g., the action being executed) on the client 110. The digital assistant 114 presents the relevant content on the display of the client 110 via the overlay interface for at least a duration that corresponds to the execution of the action. That is, as long as the tasks associated with the action are performed, the overlay interface is displayed at the highest displayed layer of visual output to hide the underlying tasks being automated by the digital assistant 114. To this end, any visual data generated for display by the application(s) being interacted with on behalf of the digital assistant 114 are hidden from the user. Instead, the overlay interface displaying content that is relevant to the user's request is presented for display.

The relevant content can include a variety of information, including: suggested commands for the same or a different application that are recognizable by the digital assistant 114 and associated with a corresponding set of actions to achieve a different or similar result, and/or suggested commands for the same or different application that are recognizable by the digital assistant 114 and associated with a corresponding set of actions that are contextually relevant to the user based on at least a portion of the received command and/or contextual data obtained by the client 110, as will be described.

Figure 2:
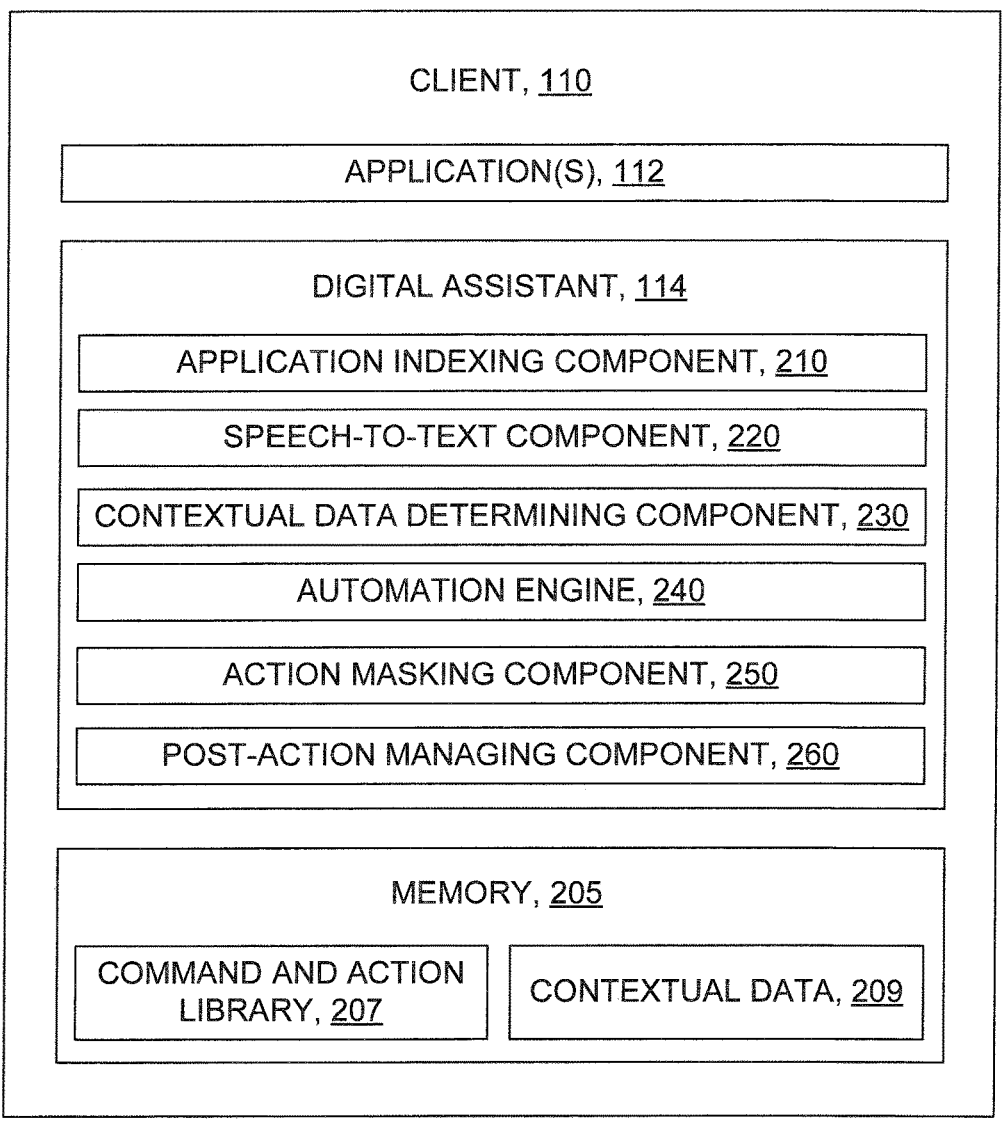
FIG. 2 is a block diagram illustrating an exemplary implementation of a client having a digital assistant in accordance with some embodiments of the present disclosure.

Referring now to FIG. 2, a block diagram 200 is provided to illustrate an exemplary implementation of a client 110 having one or more applications 112 installed thereon and a digital assistant 114 in accordance with some embodiments of the present disclosure. As noted herein, the client 110 can include a memory 205 for storing, among other things, a command and action library 207 and contextual data 209 associated with the client 110 and/or a profile associated with the client 110.

The command and action library 207 can include, among other things, a dataset of recognizable commands and corresponding actions. The commands and actions stored in the library 207 may be limited to the applications currently installed on the client 110, or may include a collection of commonly used (e.g., popular) applications installed by a larger population of clients, such as clients 115a-115n of FIG. 1. In some aspects, the commands and actions can be further limited based on versions of the application or the platform (e.g., operating system) on which the applications are executed. While storage of a larger dataset of recognizable commands and corresponding actions is preferable for offline availability of the digital assistant, in some instances the command and action library 207 can only include a single command or a small set of commands and corresponding action(s) retrieved from a server, such as server 120, based on the command(s) recently received by the digital assistant 114.

The contextual data 209 can include a variety of information including device information, profile information, and historical information. The device information can include current device location data (e.g., GPS coordinates), surrounding signal data (e.g., recognized wireless signals, Bluetooth, cellular, NFC, RFID, Wi-Fi, etc.), among other things. The profile information can include user demographic information (e.g., gender, location, income, occupation, etc.), personal preferences (e.g., foods, entertainment, sports teams, etc.), relationships (e.g., other users also having digital assistant 114 on their respective computing devices, social network connections, etc.), calendar information (e.g., appointments, times, locations, attendees, etc.), and the like. Historical information can include commands or portions thereof previously provided to and/or recognized by the digital assistant 114, device information history, profile information history, among other things. The stored command and action library 207 and contextual data 209 stored in memory 205 can provide the digital assistant 114 with information that can be analyzed and employed to provide relevant and useful information to a client 110 user when automated actions are being performed.

To implement various embodiments described herein, the digital assistant 112 can include, among other things, an application indexing component 210, a speech-to-text component 220, a contextual data determining component 230, an automation engine 240, an action masking component 250, and a post-action managing component 260. The described components are not intended to be limited to the specific structure, order, or devices described herein, and can be implemented in such ways where operations described therein can be swapped, intermixed, or modified to achieve the same or similar results described within the purview of the present disclosure.

The application indexing component 210 of the digital assistant 114 can scan an index of applications installed on the client 110 to identify a set or "index" of applications particular to the client 110. In this way, in accordance with some embodiments, the digital assistant 114 can employ the data obtained by application indexing component 210 and determine the specific set of commands available to the user for the applications currently installed on the client 110. This information can be employed by the digital assistant 114, for instance via action masking component 250, to identify relevant suggestions for applications currently installed on the client 110. Embodiments are not necessarily limited to the foregoing, and other embodiments consider that the index of applications can be submitted to the server 120, stored in contextual data 209, or any combination thereof.

The speech-to-text component 220 of the digital assistant 114 can receive audio input data via, by way of example, a microphone coupled to the client 110. The audio data, including speech data, can then be processed by the digital assistant 114 and converted into a string of text. This string of text can include, among other things, keywords, parameters, fillers, or any other aspect of a spoken language that is relayed by a user to the digital assistant 114 via speech communication. It is contemplated that the spoken language is in any language in which the digital assistant 114 is capable of handling, which can be based on a command and action library 207 including commands in the spoken language, or a translation engine that can be employed to translate the spoken language into a command that is then interpreted by the digital assistant 114 in the native language of the predefined commands.

The contextual data determining component 230 can, among other things, retrieve contextual data 209 from one or more components of or in communication with the client 110. In addition, the contextual data determining component 230 can facilitate the interpretation or completion of the string of text generated by the speech-to-text component 220. As described, the speech-to-text component 220 merely generates a converted string of text from received speech data. In some embodiments, the contextual data determining component 230 can employ the contextual data 209 stored in memory 205 to facilitate the generation or completion of an appropriate command recognizable by the client 110 (e.g., mapped to an installed application based on application indexing component 210, or available in command and action library 207). The client 110 may itself, or employing server 120 via remote communications, employ machine-learned models to either replace the string of text generated by speech-to-text component 220 or complete the string of text to provide a recognizable command to the digital assistant 114 based on equivalencies determined via the machine-learned model.

The automation engine 240 can perform a series of steps or "tasks" defined in an action that corresponds to the received command. Each task can be performed automatically by the digital assistant 114 by emulating button presses, pauses, responsive inputs, conditional inputs, or other inputs typically provided by a user, accessing application deep links or URLs that can invoke specific operations of one or more applications, and other operations that are necessary to achieve the desired result of performing all tasks associated with an action.

Figure 3:
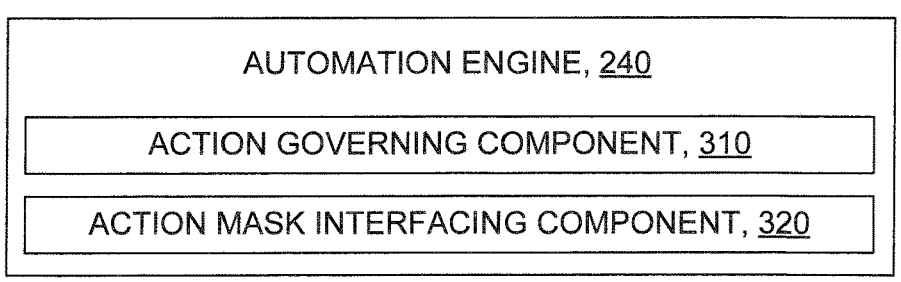
FIG. 3 is a block diagram illustrating an exemplary implementation of an automation engine in accordance with some embodiments of the present disclosure.

With brief reference now to FIG. 3, the automation engine 240 can include, among other things, an action governing component 310 and an action mask interfacing component 320. In various embodiments, the action governing component 310 can determine when to initiate a selected action (e.g., based on a determination that the command is defined in the command and action library 207), determine when various operations or tasks of an action are completed so that subsequent operations or tasks of the action can be initiated, (e.g., based on expected GUI events generated by an application), and determine when an action is fully completed (e.g., also based on expected GUI events or after completion of the final task) to provide a result or confirmation to the user that the desired action was successfully executed. In some instances, the action governing component 310 can terminate a task based on a received command. A terminate command can be received via the action mask interfacing component 320, which facilitates communications between the action governing component 310 and the overlay interface described in accordance with some embodiments described herein.

Looking now to FIGS. 4A-4D, illustrations are provided to depict visible, unmasked steps 400a, 400b, 400c, 400d of an exemplary automated action in accordance with an embodiment of the present disclosure. The following steps can be facilitated by digital assistant such as digital assistant 114, having an automation engine such as automation engine 240 of FIGS. 2 and 3. The following description is merely exemplary and is not intended to be limiting in any way. Features and illustrations depicted in the figures are only provided to show an exemplary implementation, and are not to limit the sequence of events or layout of the graphical user interface. The illustrations of FIGS. 4A-4D are provided herein to provide a clear depiction of an unmasked and visible sequence of events in action automation against an improved technique for optimizing display engagement in action automation, as will be described in more detail with reference to FIGS. 6A-6D.

Figure 4A:
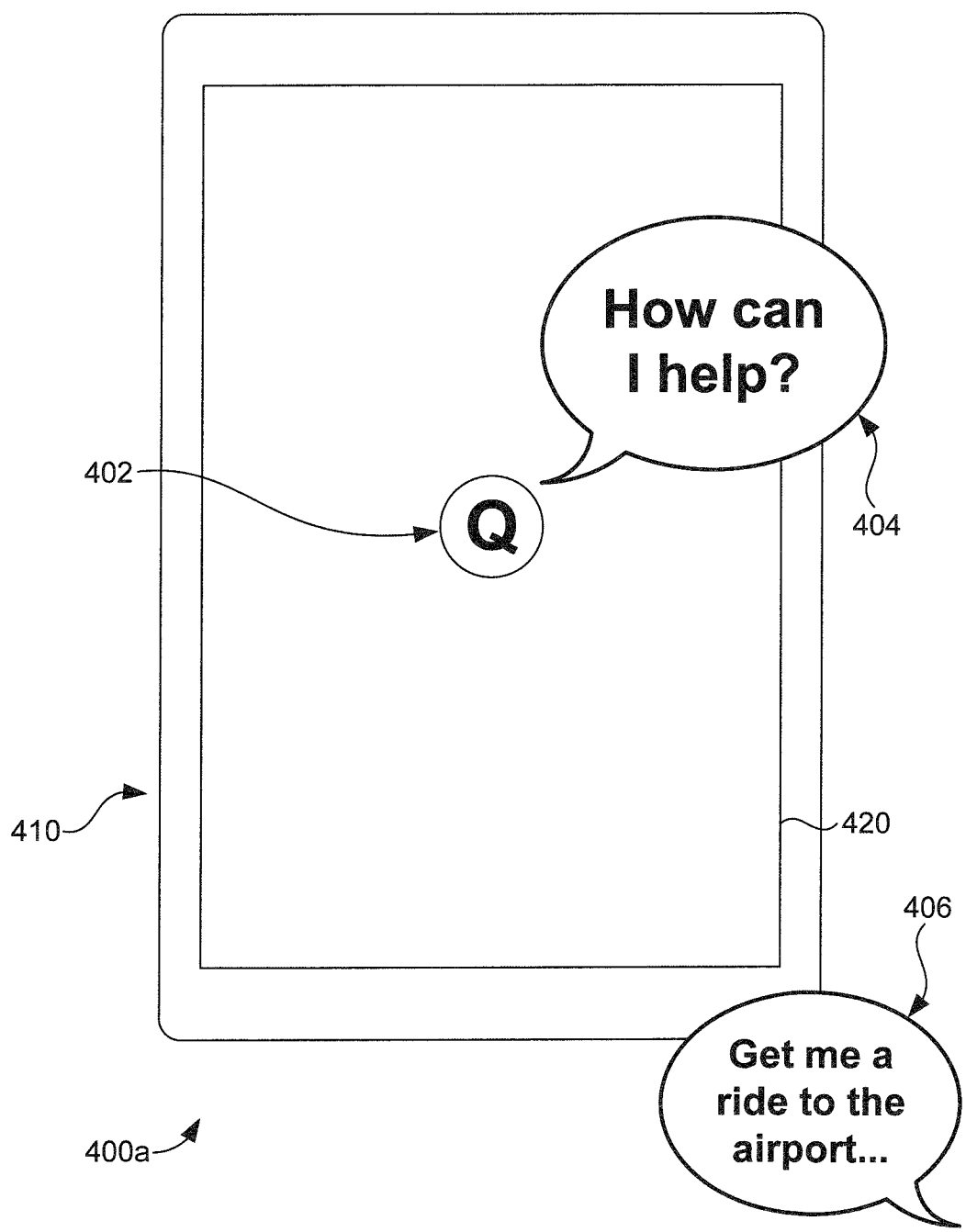
FIG. 4A is an illustration depicting an exemplary conversational exchange with a digital assistant in accordance with some embodiments of the present disclosure.

With reference to FIG. 4A, illustrating a first step 400a of the automated action process, a computing device 410 is provided having a display 420. On the display 420 is an indicator 402 that the digital assistant (e.g., digital assistant 114) has been activated. It is contemplated that the digital assistant can be activated by a voice prompt (e.g., "hello Q"), a physical input (e.g., button press or touch), gesture, or the like. Speech bubble 404 depicts an output that can be generated by the digital assistant in response to its activation, prompting a user to provide input thereto. In various embodiments, the generated output can be an audio signal emitted via a speaker (not shown) of the computing device 410, a visual output 404 via the display 420, or other mechanism to communicate an output to a user. Speech bubble 406 depicts an input that can be provided by a user to the digital assistant responsive to the prompt. The illustrated input of speech bubble 406 depicts a speech input generated by the voice of the user, requesting that the digital assistant arrange a ride for the user to get to the airport.

Figure 4B:
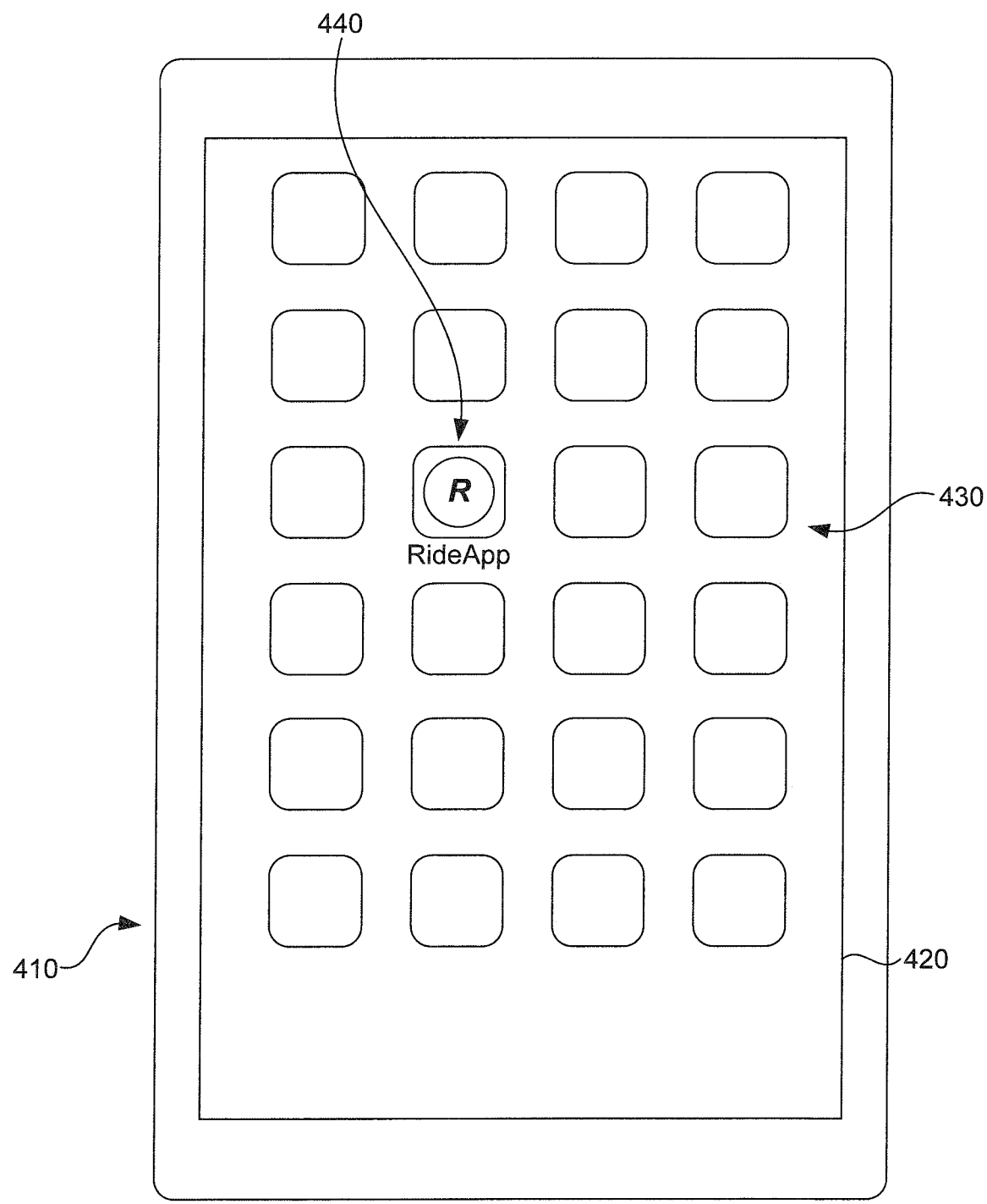
FIGS. 4B-4C are illustrations depicting visible, unmasked steps of an exemplary automated action in accordance with some embodiments of the present disclosure.

Moving on to FIG. 4B, illustrating a second step 400b of the automated action process, a home screen or "app" selection screen 430 of the computing device 410 is presented in response to the execution of a first task of an action determined to correspond to the recognized command (e.g., based on the ride request 430). In other words, the first task of the action is to activate the "RideApp" application, represented by the RideApp icon 440. As noted the illustration is merely exemplary, and it is contemplated that an application can be activated in any number of ways, including emulated navigation and touches, deep links, API calls, and the like. However, as illustrated, the digital assistant identifies the appropriate application and emulates a touch to select and activate the RideApp 440.

Figure 4C:
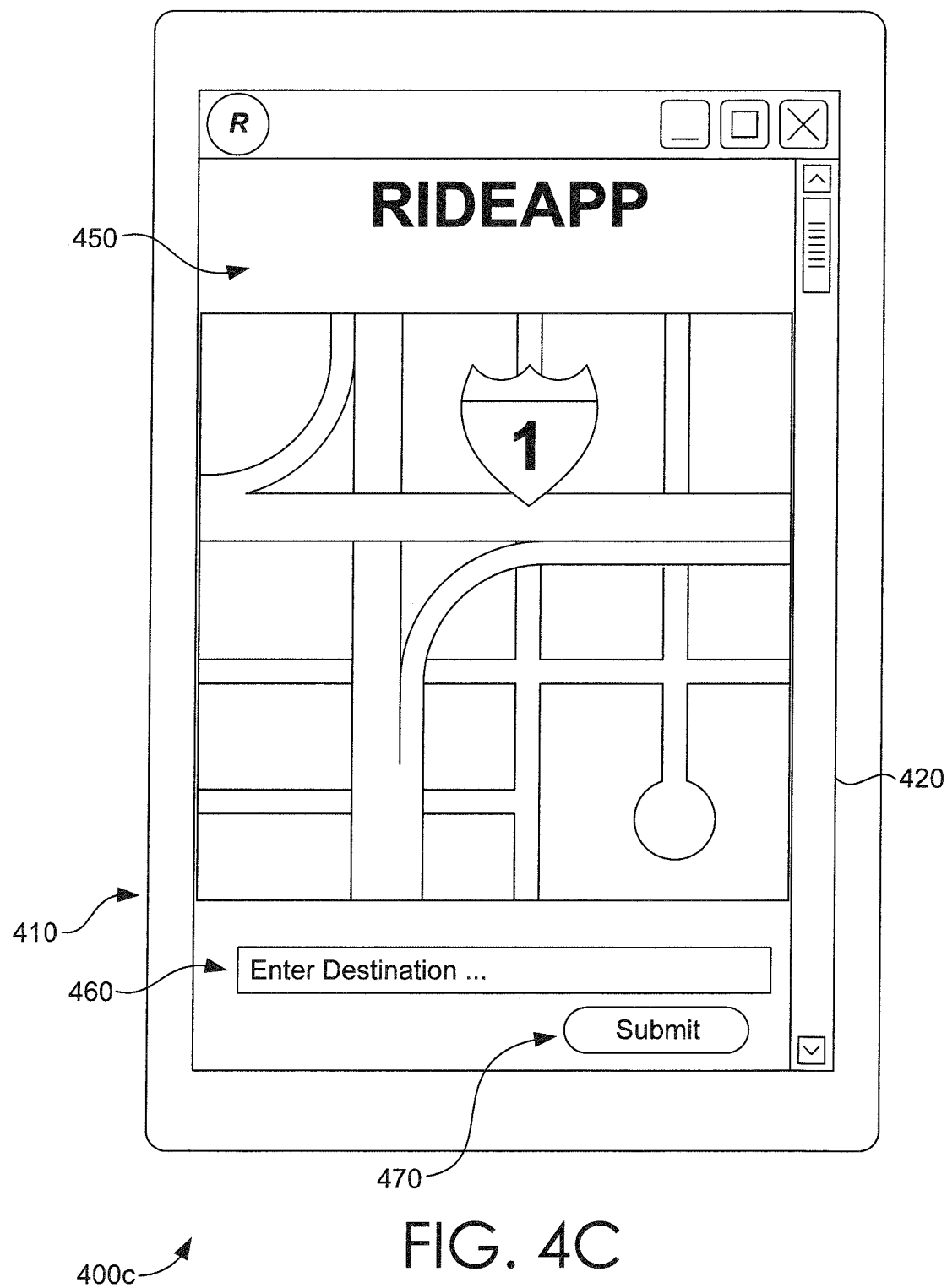

Moving now to FIG. 4C, illustrating a third step 400c of the automated action process, a graphical user interface ("GUI") 450 of the activated RideApp is presented in response to the emulated touch selecting the RideApp icon 440 of FIG. 4B. Here, the RideApp GUI 450 depicts a graphical map and form elements 460, 470 that can require user input and interaction. More specifically, a destination field 460 is presented, and a submit button 470 is provided to process a request including a destination provided by user input into the destination field 460. At this time, the digital assistant, employing the predefined second task of the action, can select the destination field (e.g., via an emulated touch), and populate the destination field 460 with "airport" determined as a parameter. In various embodiments, the input can be provided via a paste operation from a clipboard populated with the parameter, key presses may be emulated by the digital assistant, or the parameter may be passed via a deep link to the application, among other techniques. As a final task in the action, the digital assistant emulates a touch input to the submit button 470 to process the request.

Figure 4D:
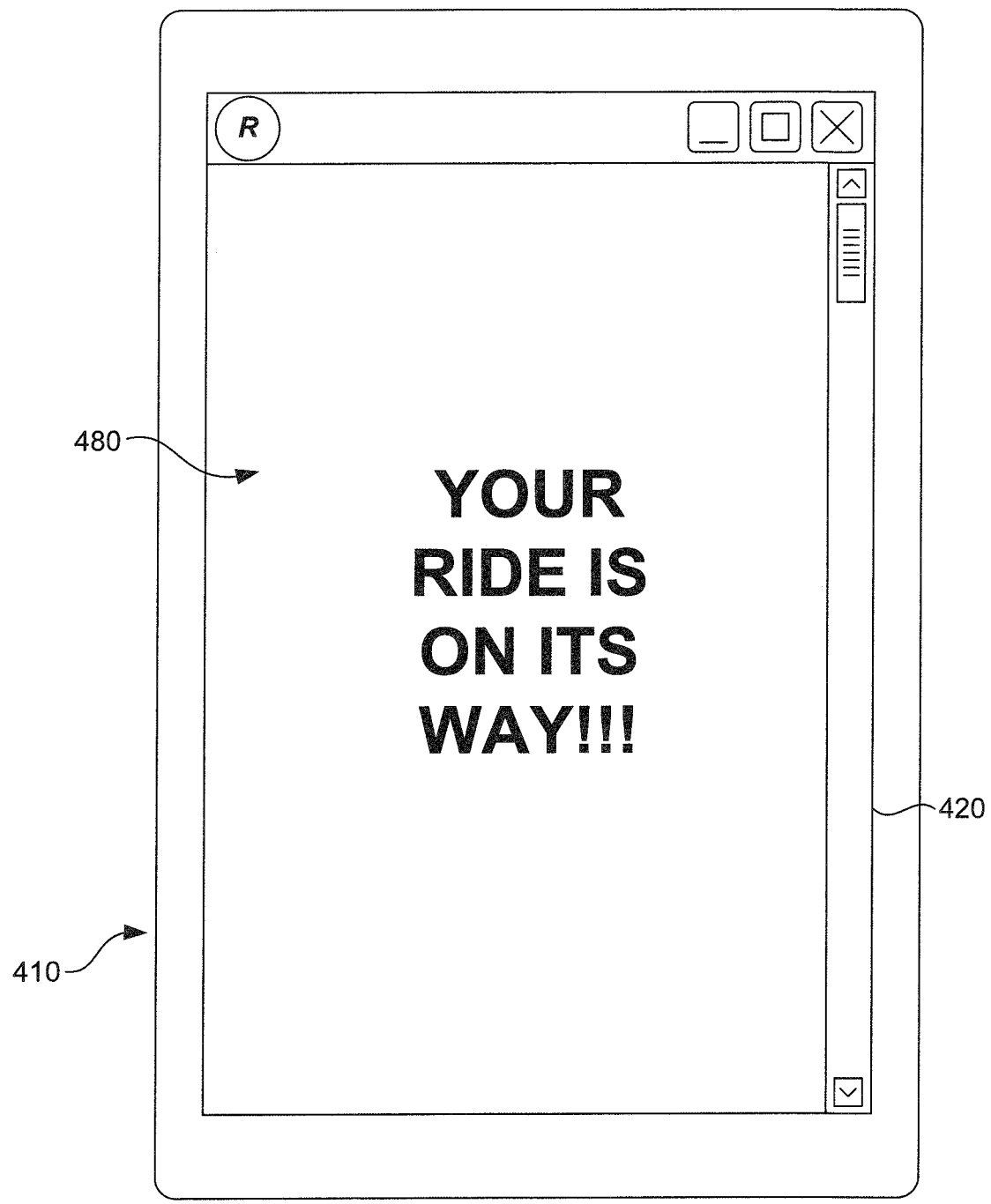
FIG. 4D is an illustration depicting an exemplary resulting user interface in accordance with some embodiments of the present disclosure.

Looking now to FIG. 4D, illustrating a final and fourth step 400d of the automated action process, a resulting interface or GUI 480 of the activated RideApp is presented in response to the requested submission described in FIG. 4C. As depicted, the final task was performed and the execution of the action is completed including a confirmation message presented by the RideApp application. As the illustrations merely depict the stages of the automated action, one can appreciate that each step of the action remains visible in accordance with the embodiment described in FIGS. 4A-4D, and that the display 420 is entirely consumed by the application as its focus is generally required to provide the inputs thereto and generate the desired result.

Figure 5:
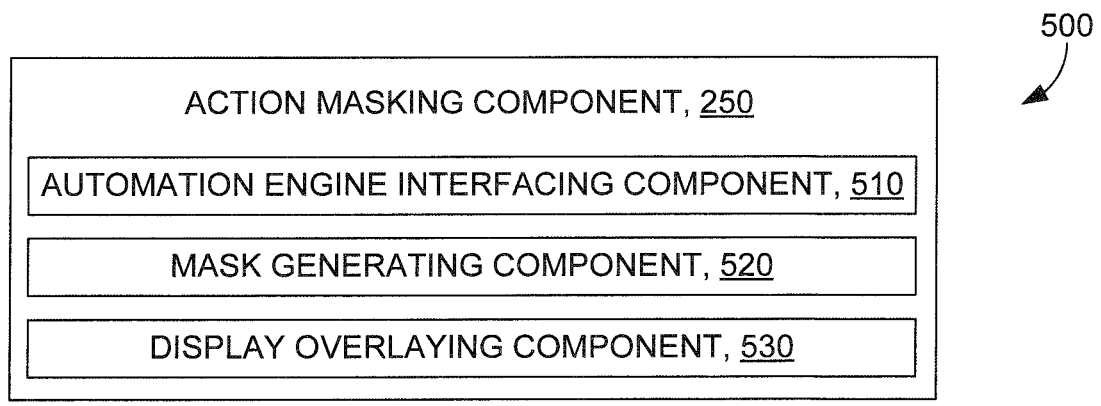
FIG. 5 is a block diagram illustrating an exemplary implementation of an action masking component in accordance with some embodiments of the present disclosure.

Briefly referencing back to FIG. 2, the action masking component 250 of the digital assistant 114 can generate an overlay interface to both mask the action being executed, and further provide relevant information for display to a user. In more detail, with reference now to FIG. 5, a block diagram 500 is provided to illustrate an exemplary implementation of an action masking component in accordance with some embodiments of the present disclosure. In some embodiments, the action masking component 250 can include, among other things, an automation engine interfacing component 510, a mask generating component 520, and a display overlaying component 530.

In some embodiments, the automation engine interfacing component 510 can interface (e.g., communicate) with the action mask interfacing component 320 of FIG. 3. In this way, the digital assistant 114 can employ the action mask interfacing component 320 to inform the action masking component 250 that an action is being invoked and/or when the action has completed execution. In some further embodiments, the automation engine interfacing component 510 can receive a termination signal via an overlay interface generated by the action masking component 250 (e.g., based on a touch signal received via the overlay interface), and communicate the termination signal to the action governing component 310 of automation engine 240, terminating execution of the action or halting further tasks from being performed by the digital assistant 114.

The mask generating component 520 can, in accordance with some embodiments, generate an overlay interface that includes, among other things, one or more user interface elements that each includes content that is determined to be relevant to the command received by the digital assistant 114 and/or contextual data 209 obtained by the digital assistant 114, in accordance with embodiments described herein. A user interface element can include images, text data, metadata, links (e.g., URLs), deep links, links to invoke further actions, videos, or other types of media locally or remotely stored and accessed by the digital assistant 114.

The content included in a user interface element can be determined in various ways in accordance with embodiments described herein. For instance, in one embodiment, the content can be selected from a collection of already generated or stored content and/or user interface elements including such content. The content and/or user interface elements can be stored locally in memory 205, or remotely in server 120 or a database 140 retrievable by the digital assistant 114. The content can include, among other things, a textual representation of a command, a textual representation of application(s) associated with the command, an image (e.g., an icon) associated with the application(s) associated with the command, metadata including any combination of the foregoing, or any other type of information. In some aspects, any piece of content (e.g., stored in a cache, memory, file, or database) can have a unique identifier that is catalogued and indexed with related pieces of content so that the content can be easily determined and retrieved for relevance to a command received by the digital assistant 114 and/or contextual data 209 obtained by the digital assistant 114.

In some other embodiments, a user interface element(s) can be dynamically generated by the digital assistant 114 based at least in part on one or more terms (e.g., keywords, parameters) of a command received for invocation by the digital assistant and/or contextual data 209. In various embodiments, the digital assistant 114 can determine additional context for the received command (for instance, by employing contextual data determining component 230) based on keywords and/or parameters parsed out of the command string generated by speech-to-text component 230 of FIG. 2. In further embodiments, the additional context can be determined based on contextual data 209 stored in memory 205. As described with regard to contextual data determining component 230, the determined additional context can provide clarifying or additional context to the digital assistant 114, such that a proper command is identified to determine a proper command to perform and/or an actual intent of the user.

In this regard, in one embodiment, a received command is recognized by the digital assistant 114, an analysis on the command and action library 207 can be performed by the digital assistant 114 to identify one or more additional commands (e.g., command suggestions) that are predefined and recognizable by the digital assistant 114. An additional command or "command suggestion" can be identified based on a determination by the digital assistant 114 that the additional command's corresponding action is performed on the same application(s) associated with the received command, or a determination by the digital assistant 114 that the received command can also be invoked on different application(s) installed or available for installation on the client 110.

As was described, the mask generating component 520 can generate an interface overlay and include one or more user interface elements including relevant content. In some embodiments, the user interface element can include one or more of the aforementioned commands also associated with the one or more applications currently being acted on (e.g., performing the tasks of the action automated by the digital assistant), a different application that also corresponds to the received command (e.g., a different ridesharing app than the example RideApp of FIGS. 4A-4D) installed on the client 110 or available for installation via an application marketplace, or in some further embodiments, can include a tip or a "how-to" associated with any of the aforementioned applications or the digital assistant 114, among many other things determined to have relevance to the user. As referenced herein, relevance can include content or information that, based on a portion of the received command (e.g., parameters or keywords) and/or contextual data 209 available to the digital assistant 114, is likely to be of interest to the user. In some aspects, the user interface element can include third-party content, such as an advertisement for a service, good, transaction, or even another application that can potentially fulfill a need of the user based on the received command and/or contextual data 209. In such embodiments, third-party content can also include metadata or be catalogued in a manner that a query including a keyword, parameter, or other term included in the received command (or associated with the one or more applications on which the digital assistant 114 is acting on) can retrieve a likely relevant piece of third-party content.

In some embodiments, the mask generating component 520 can query, retrieve, select, and/or generate one or more user interface elements that includes one or more of the aforementioned pieces of content. The mask generating component 520 can include the one or more user interface elements into the process of generating the overlay interface, and format the user interface element(s) accordingly based on a number of user interface elements included in the generated overlay. In some embodiments, the mask generating component 520 can generate an overlay interface sized to mask only the GUI portion associated with the one or more applications on which the action is being performed. In a preferred embodiment, the generated overlay interface is sized to mask the entirety of the client display to maximize user engagement therewith. In various embodiments, the user can be provided with useful information via the overlay, providing details on how to further interact with the digital assistant 114, and potentially reveal new features or services that the user was previously unaware of.

The display overlaying component 530 can receive a signal, from the automation engine 240 of FIG. 2 via the automation engine interfacing component 510, indicating that the generated overlay is to be provided for display to mask the action being performed based on the received command. As was described, the mask generating component 520 can define parameters (e.g., size, location) of the overlay such that the display overlaying component 530 can mask the action accordingly.

Figure 6A:
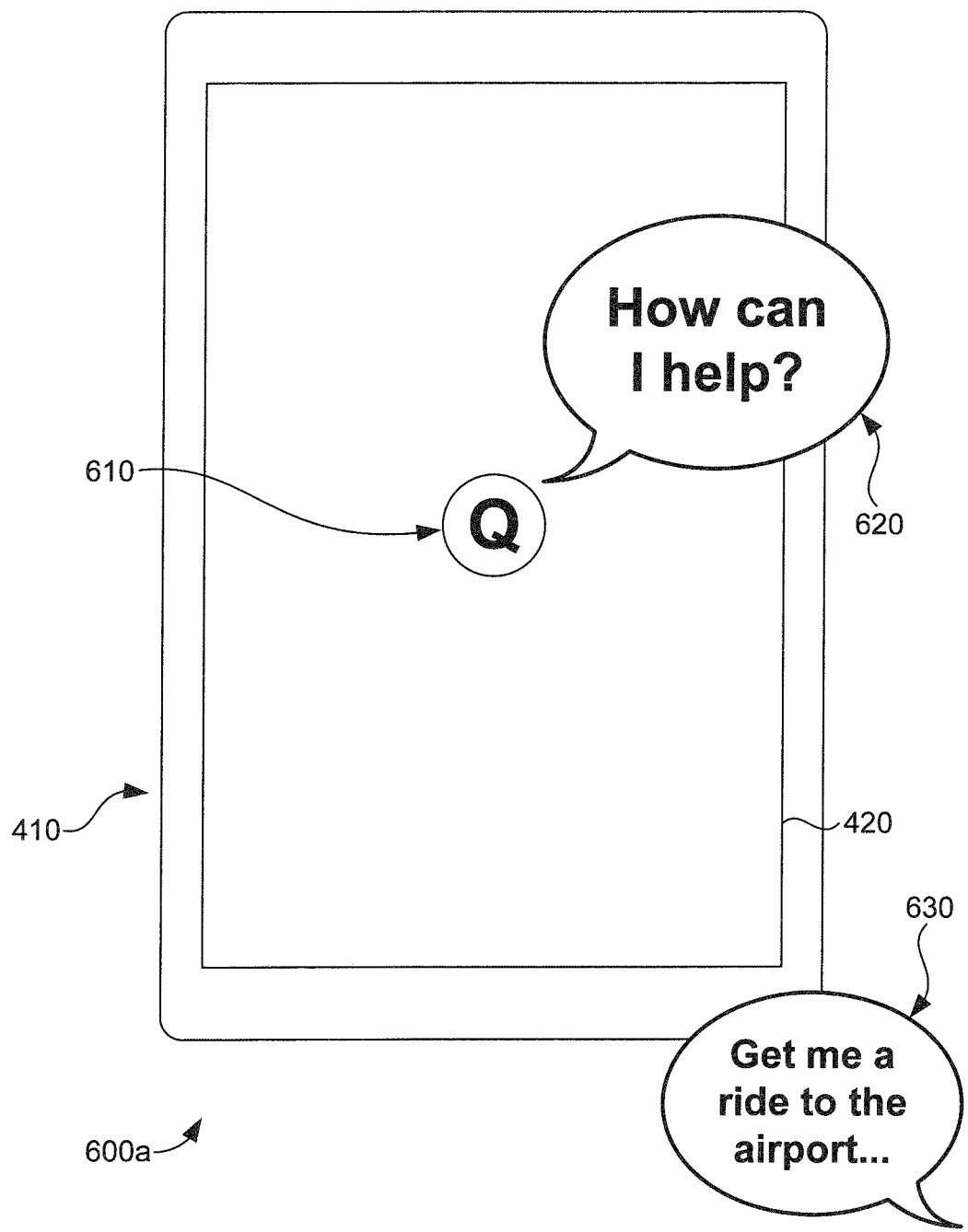
FIG. 6A is an illustration depicting an exemplary conversational exchange with a digital assistant in accordance with some embodiments of the present disclosure.

With reference now to FIG. 6A, illustrating a first step 600a of a masked automated action process in accordance with embodiments described herein, a computing device 410 is provided having a display 420. In accordance with the description provided herein with respect FIG. 4A, an indicator 610 is presented indicating that the digital assistant (e.g., digital assistant 114) has been activated. Speech bubble 620 depicts an output that can be generated by the digital assistant 114 in response to its activation, prompting a user to provide input (e.g., a spoken command) thereto. Speech bubble 630 depicts an input that can be provided by a user to the digital assistant responsive to the prompt or indicator 610. The illustrated input of speech bubble 630 depicts a speech input (e.g., "get me a ride to the airport") generated by the voice of a user, requesting that the digital assistant 114 arrange a ride for the user to the airport, as similarly described with respect to FIG. 4A.

Figure 6B:
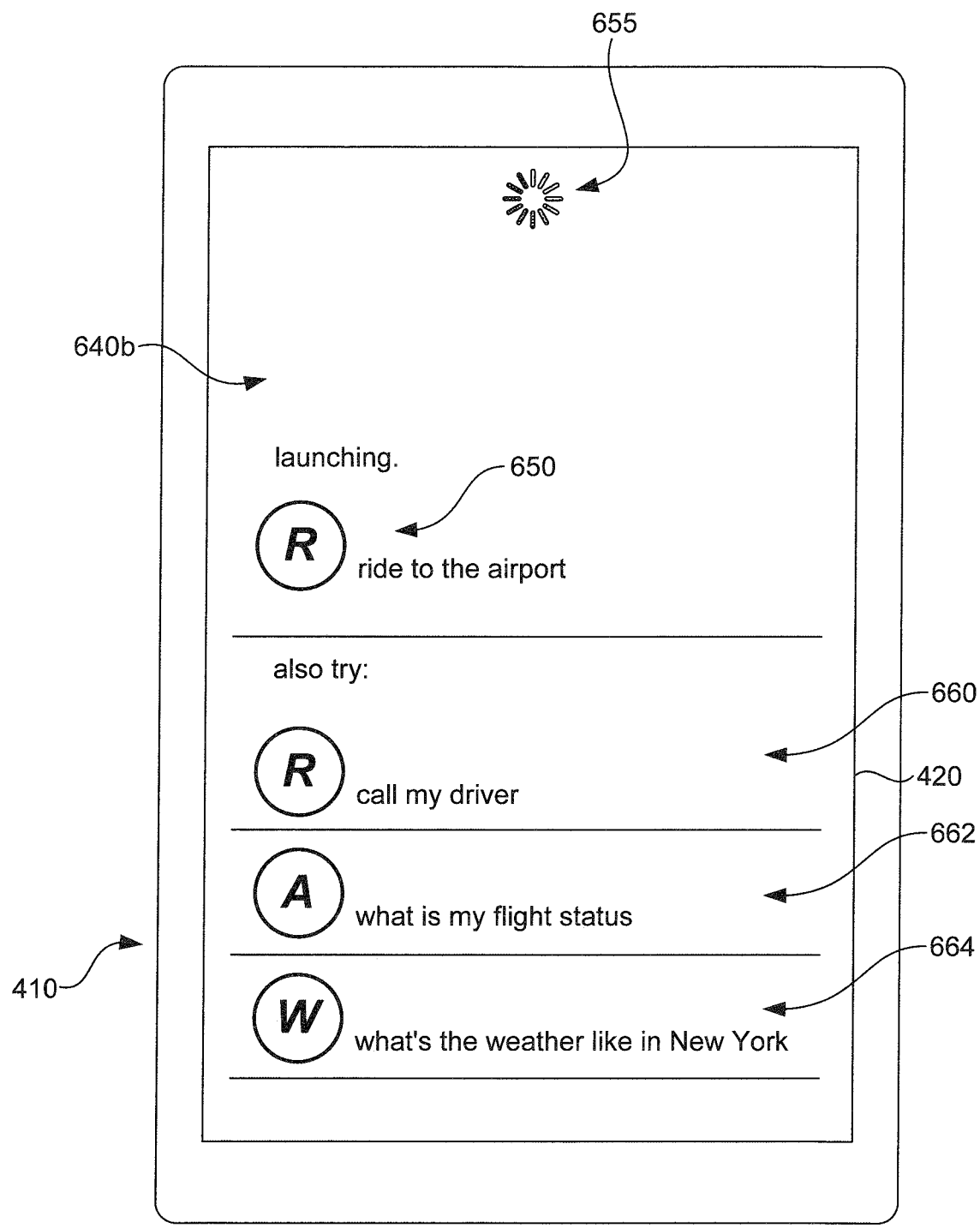
FIGS. 6B-6C are illustrations depicting exemplary overlay interfaces masking visible steps of an automated action in accordance with various embodiments of the present disclosure.

Moving on to FIG. 6B, an illustration is provided to depict an embodiment for an exemplary execution state of a masked automated action 600b. Instead of the home screen or "app" selection screen 430 of FIG. 4B, an overlay interface 640b is presented in response to the execution of the action determined to correspond to the recognized command (e.g., based on the ride request 630). In other words, any tasks that are performed by the digital assistant 114 that would typically be displayed to the user via display 420 are hidden underneath the overlay interface 640b. In this regard, the application GUI such as the ones depicted in FIG. 4B-4C are masked from exposure to the user. Instead, the overlay interface 640b is provided for display including, among other things, an action launch indicator 650 describing the received command and association application(s) (e.g., RideApp) on which the action corresponding to the command is to be performed. The launch indicator 650 can include one or more images (e.g., an application icon or other related symbol) instead or in addition to the description. Although not depicted herein, it is contemplated that a series of tasks on a plurality of applications can correspond to a received command. In this regard, the launch indicator 650 can describe the command and each application involved in the action (e.g., represented with multiple or hybridized icons, symbols, and the like). As the action is being performed, the overlay interface 640b can also include a progress indicator, such as progress indicator 655. The progress indicator can be represented by a spinning wheel, hourglass, progress bar, or any other visual and/or audible indicator that can provide a user with an indication that the action has been invoked, is being executed, and/or has finished being executed.

In some embodiments, the displayed overlay interface 640b can also include relevant user interface elements 660, 662, 664. Among other things, a relevant user interface element 660, 662, 664 can include content that is relevant to the user based on the received command and indicated by launch indicator 650. By way of example, user interface element 660 depicts a command suggestion that the digital assistant 114 has determined as being relevant and potentially useful to a user based on the received command. The user interface element 660 includes another command that is associated with the application on which the current action is being performed, and includes a text description of a command (e.g., "call my driver") that can be useful to the user after execution of the current action is completed. In some other embodiments, any command associated with the application on which the current action is being performed, regardless of its utility with respect to the current action being performed, can be provided to the user, simply as a tutorial on how to further take advantage of the digital assistant 114.

By way of another example, user interface element 662 depicts another command suggestion that the digital assistant 114 has determined as being relevant and potentially useful to the user based on the received command. Like the user interface element 660, user interface element 662 includes another text description of a command (e.g., "what is my flight status") that can be useful to the user after execution of the current action is completed. However, unlike user interface element 660, user interface element 662 includes a command associated with an entirely different application than the application on which the current action is being performed. More particularly, overlay interface 640b presents an exemplary user interface element 662 determined by digital assistant 114 as having contextual relevance to the user based on the received command (e.g., "get me a ride to the airport").

As was described herein, the digital assistant 114 or server, such as server 120 of FIG. 1 in communication with the digital assistant 114, can store contextual data about the user in a user profile, for instance. Based at least in part on the received command, the digital assistant 114 is informed that the user is heading to the airport. In various embodiments, contextual data associated with the user can also be considered by the digital assistant 114, which can include by way of example, a previous action invoked (e.g., a flight previously booked or calendar entry made) via the digital assistant 114, a third-party service (e.g., a travel service) in communication with the digital assistant 114 or server 120, an email (e.g., a flight confirmation email) or a calendar entry (e.g., a flight itinerary) of the user and processed by the digital assistant 114, or any other technique that can provide contextual data for facilitating a determination of content relevance. In this example, the keyword "airport" could have triggered a determination by the digital assistant 114 to suggest a relevant command to the user via an associated application (e.g., an airline application). As described herein, the example is not intended to be limiting, and command suggestions are not necessarily tied to personalized contextual data analyzed by the digital assistant. In some embodiments, the suggested command can be determined based on generic contextual data including, among other things, keywords or other terms included in the received command (e.g., "airport").

By way of another example, user interface element 664 depicts yet another command suggestion that the digital assistant 114 has determined as being relevant and potentially useful to the user based on the received command. Like user interface elements 660, 662, user interface element 664 includes another text description of a command (e.g., "what's the weather like in New York") that can be useful to the user after execution of the current action is completed. Like user interface element 662, user interface element 664 includes a command associated with an entirely different application than the application on which the current action is being performed. Unlike user interface element 662, user interface element 664 depicts an exemplary user interface element 664 determined by digital assistant 114 as having contextual relevance to the user based indirectly on the received command (e.g., "get me a ride to the airport"), with more weight given to the contextual data associated with the user (e.g., a user profile), such as contextual data 209 of FIG. 2. User interface element 664 presents a command that, unlike user interface element 662, has no reference to the airport or a flight. Instead, the user interface element 664 includes a command that has relevance to the user based on its obtained knowledge that the user's flight is directed to land in New York. In accordance with various embodiments, such knowledge is obtained by the digital assistant based on the various examples described herein.

Figure 6C:
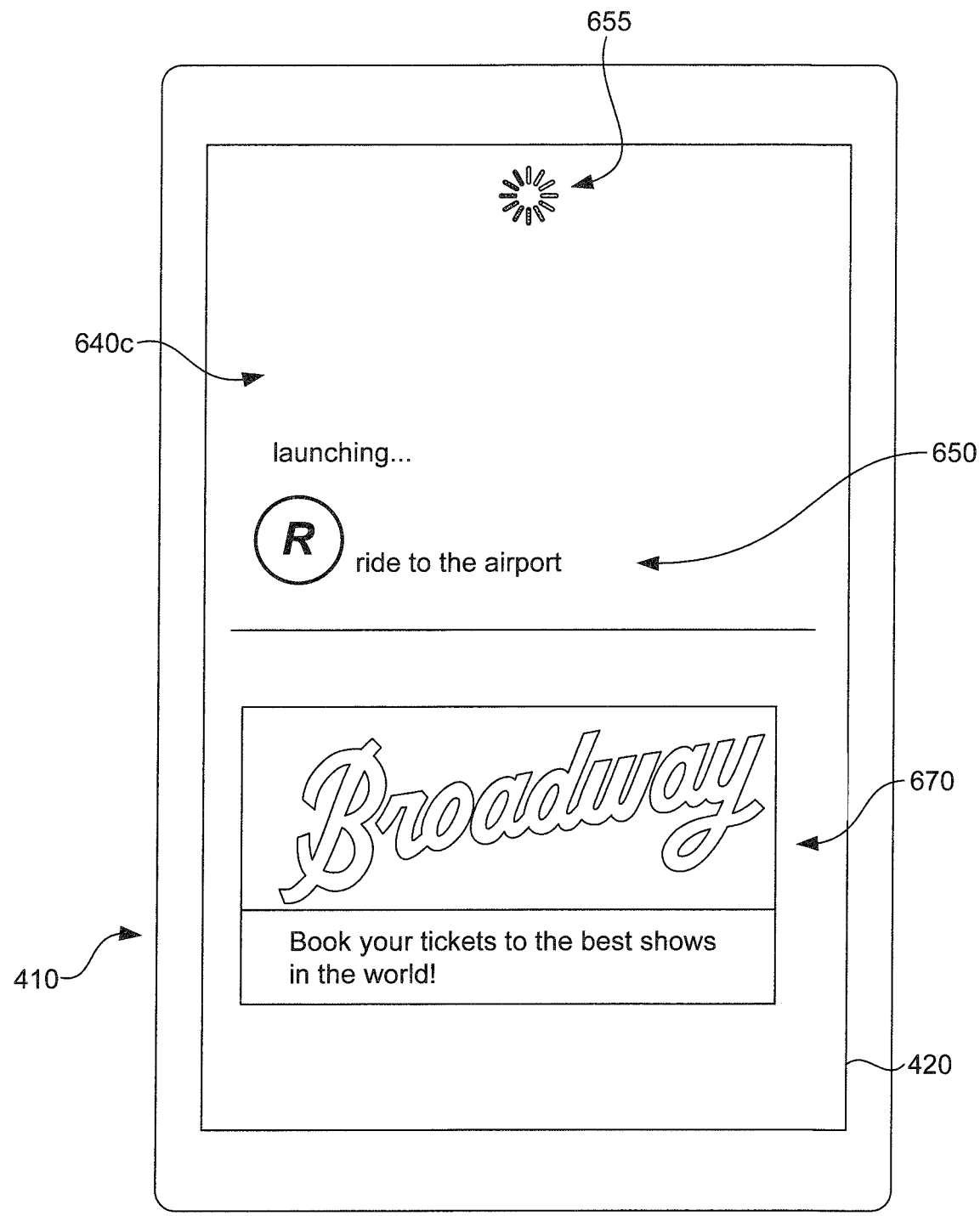

Moving on to FIG. 6C, an illustration is provided to depict another embodiment for the execution state of a masked automated action 600c. As described with respect to the embodiment depicted in FIG. 6B, an overlay interface 640c is presented in response to the execution of the action determined to correspond to the recognized command (e.g., based on the ride request 630). Similarly, any tasks that are performed by the digital assistant 114 that would typically be displayed to the user via display 420 are hidden underneath the overlay interface 640c. In addition to the launch indicator 650 and progress indicator 655 described above, the illustrated overlay interface 640c depicts another embodiment with a user interface element 670 including third-party content 670 determined by the digital assistant 114 to be contextually relevant to the received command and/or contextual data, such as contextual data 209 of FIG. 2, associated with the user and/or client 110. In the illustrated example, a marketing asset is presented for display based on a determined contextual relevance, in accordance with embodiments described herein.

In various embodiments, relevant content such as content 660, 662, 664, 670 can be provided to the client 110 for storage by server 120 or a third party server, provided to the server 120 by a third party server for retrieval by the client at any time prior to generation of the overlay 640c, and/or retrieved by the client 110 from the server 120 or third party server after the received command is processed by the digital assistant and prior to the display of an overlay interface 640b, 640c. In some embodiments, the digital assistant 114 can generate a query to the server 120 and/or third-party server including one or more keywords, terms, or parameters of the received command and/or contextual data associated with the client 110 and/or user associated therewith (e.g., the user's profile). As such, based on the query, the server 120 or third party server can determine a relevant piece of content to include in the overlay interface, such that the relevant content is accordingly presented to the user during action execution (i.e., a duration of time that would otherwise be wasted).

Figure 6D:
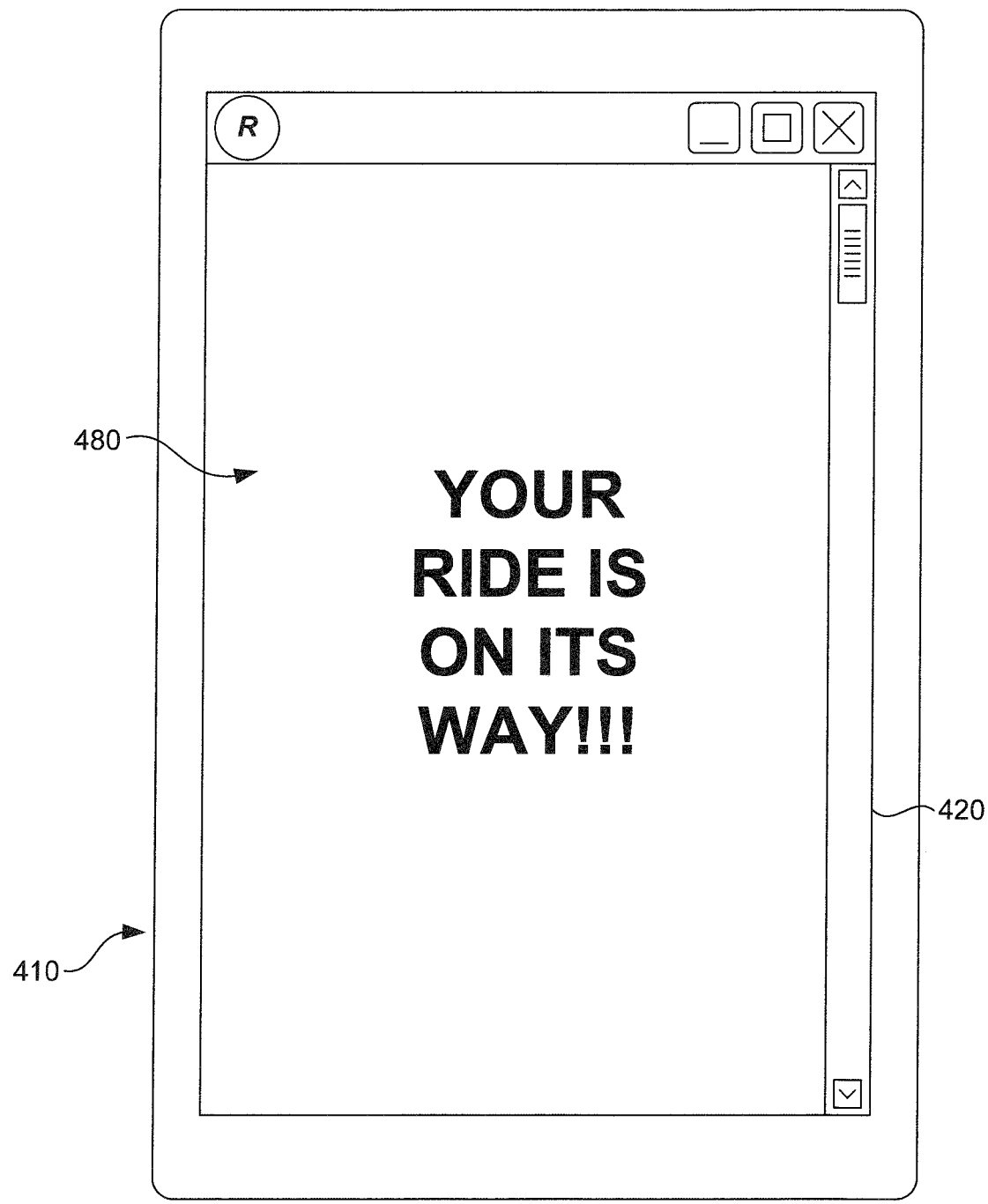
FIG. 6D is an illustration depicting an exemplary resulting user interface in accordance with some embodiments of the present disclosure.

Looking now to FIG. 6D, an illustration is provided to depict the revealed resulting interface 600d of the automated action process. A resulting interface or GUI 480 of the activated RideApp is presented in response to the requested submission described in FIG. 4C, but is hidden by an overlay interface, such as those depicted in 640b of FIG. 6B and 640c of FIG. 6C. As depicted, the final task was performed and the execution of the action is completed including a confirmation message presented by the RideApp application. Unlike the action tasks that were visible to the user in accordance with the embodiment described in FIGS. 4A-4D, embodiments described in accordance with FIGS. 6A-6D provide an optimal employment of display real estate during action automation. By providing relevant and useful information to a user as an action is being performed in response to a user-provided command, a digital assistant in accordance with embodiments described herein can optimize the deployment of available computing resources to facilitate a quick progression between related actions to achieve desirable results.

Referencing back to FIG. 2, the post-action managing component 260 of the digital assistant 114 can generate and provide for display one or more additional user interface elements that, when displayed, are presented along with the resulting interface of the automated action process, such as the resulting interface 600d of FIG. 6D. The additional user interface element(s) generated by the post-action managing component can include content that corresponds to the content of one or more user interface elements included and displayed on the overlay interface, such as overlay interface 640b of FIG. 6B and 640c of FIG. 6C.

Figure 7:
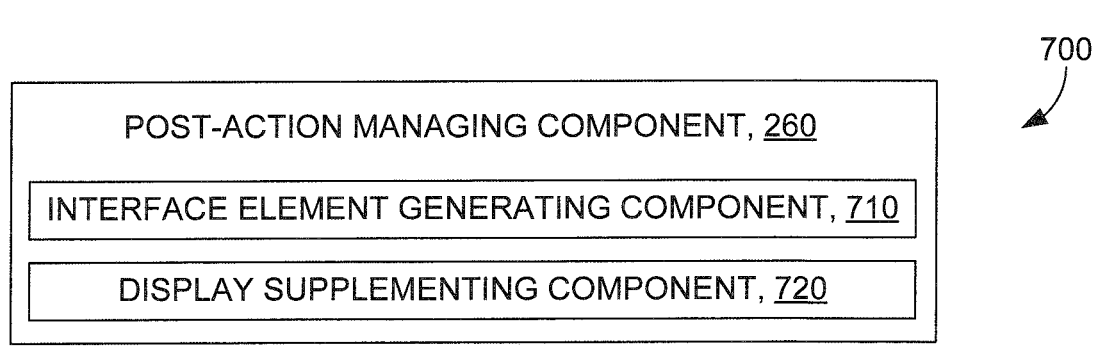
FIG. 7 is a block diagram illustrating an exemplary implementation of a post-action managing component in accordance with some embodiments of the present disclosure.

In more detail, with reference now to FIG. 7, a block diagram 700 is provided to illustrate an exemplary implementation of a post-action managing component 260 in accordance with some embodiments of the present disclosure. In some embodiments, the post-action managing component 260 can include, among other things, an interface element generating component 710, and a display supplement component 720.

The post-action managing component 260 can employ the interface element generating component 710 to generate, based on the content determined to be relevant for display on the overlay interface (for instance, by mask generating component 520 of FIG. 5), an additional one or more user interface element having content that corresponds to the relevant content displayed on the overlay interface. By way of example, any one or more of the user interface elements 660, 662, 664, 670 included in overlay interfaces 640b, 640c can include content that is selected by interface element generating component 710. In various embodiments, the interface element generating component 710 can select another stored user interface element, dynamically generate a user interface element, or retrieve a user interface element or content from a remote server (e.g., server 120 or a third party server), corresponding to the content of one or more user interface elements displayed on the recently-removed overlay interface.

In some embodiments, the interface element generating component 710 can select, generate, or determine one or more user interface elements having relevant content to the user based on the content of the one or more user interface elements of the overlay interface (which were based on the received command and/or contextual data). In further embodiments, the interface element generating component 710 can select, generate, or determine the one or more user interface elements based on how the display supplementing component 720 is configured to provide the one or more user interface elements for display with the resulting interface after completed execution of the automated action. For instance, in one aspect, the interface element generating component 710 can generate a small "icon-like" user interface element (e.g., a "chat head"). In another aspect, a banner can be generated by the interface element generating component 710.

In some further embodiments, an embedded operation can be included in a user interface element generated by the interface element generating component 710, or can be included independent of the digital assistant 114 (e.g., by a third party) if retrieved by the digital assistant 114. It is also contemplated that such operations are not necessary embedded into the user interface element, but can be mapped to a reference table such that any detected interactions with the user interface element can initiate an operation mapped thereto (e.g., in a reference table). In various embodiments, a user interface element can include therein an embedded action, URL, deep link, or other mechanism to execute an operation that provides additional information relating to the content of the displayed user interface element.

The post-action managing component 260 can employ the display supplementing component 720 to provide for display one or more additional user interface elements determined for presentation by the interface element generating component 710. In some embodiments, the display supplementing component 720 can provide for display an "icon-like" user interface element that appears to "float" or be layered above the resulting interface displayed after completed execution of the automated action. In some other embodiments, the display supplementing component 720 can modify display dimensions of the resulting interface displayed after completed execution of the automated action to display therewith a banner user interface element.

Figure 8A:
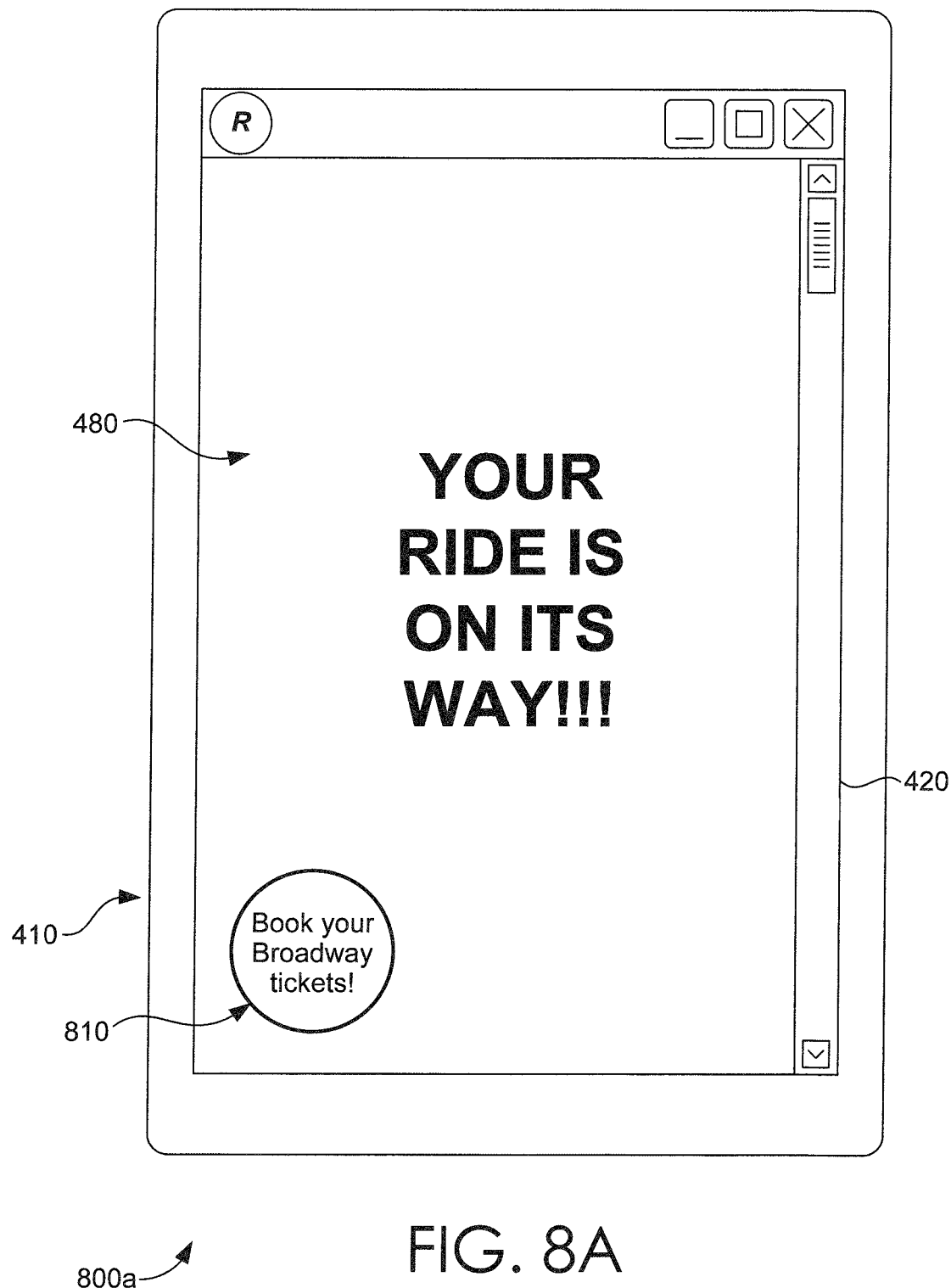
FIGS. 8A-8B are illustrations depicting an exemplary relevant user interface element with a resulting user interface in accordance with various embodiments of the present disclosure.

With reference now to FIG. 8A, an illustration is provided to depict a resulting user interface 480 or GUI displayed after an exemplary action execution has been completed. In the illustrated embodiment, the resulting user interface 480 maintains its dimensions as intended by the application associated with the GUI. The user interface element 810 can be presented on the display 420 as a small icon-like user interface element, so as to prevent excessive coverage of the underlying GUI. In some embodiments, the user interface element 810 can be moved from a first position to a second position (e.g., by a touch and drag motion corresponding thereto). It is further contemplated that the user interface element 810 can be of any size or shape in accordance with embodiments described herein. It is also noted that the content included in the user interface element 810 corresponds to (e.g., is related to) the content provided by the user interface element 670 presented on the overlay interface 640c of FIG. 6C. In this regard, if the user maintains an interest in the presented content, additional information can be accessed by the user by simply interacting with (e.g., touching) the user interface element 810.

Figure 8B:
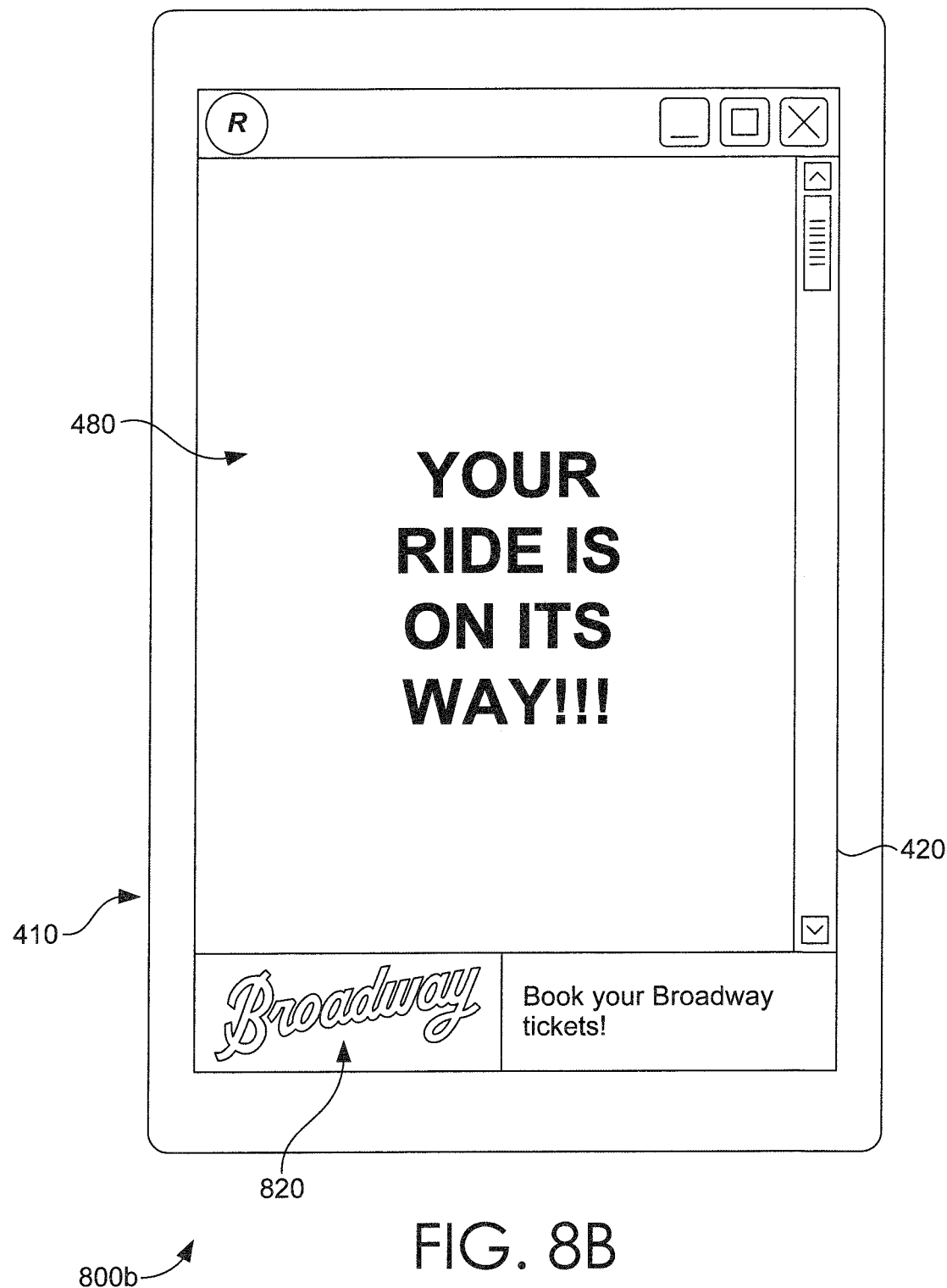

With reference now to FIG. 8B, an illustration is provided to depict a resulting user interface 480 or GUI displayed after an exemplary action execution has been completed. In the illustrated embodiment, the dimensions of the resulting user interface 480 is modified such that the user interface element 820 can also be displayed on a portion of the display 420 adjacent to the resulting user interface 480. The user interface element 820 can be presented on the display 420 as a banner-like user interface element, not interfering with the adjacently-positioned resulting user interface 480 so as to prevent any coverage of the adjacent GUI. It is contemplated that the user interface element 820 can be of any size or shape in accordance with embodiments described herein, and can also be placed to the sides or above the user interface element 820. In some embodiments, if the resulting user interface 480 includes an application programming interface (API) to present third-party content, it is contemplated that the user interface element 820 can also be included within the resulting user interface 480. It is again noted that the content included in the user interface element 810 corresponds to (e.g., is related to) the content provided by the user interface element 670 presented on the overlay interface 640*c* of FIG. 6C. In this regard, if the user maintains an interest in the presented content, additional information can be accessed by the user by simply interacting with the user interface element 810.

Figure 9:
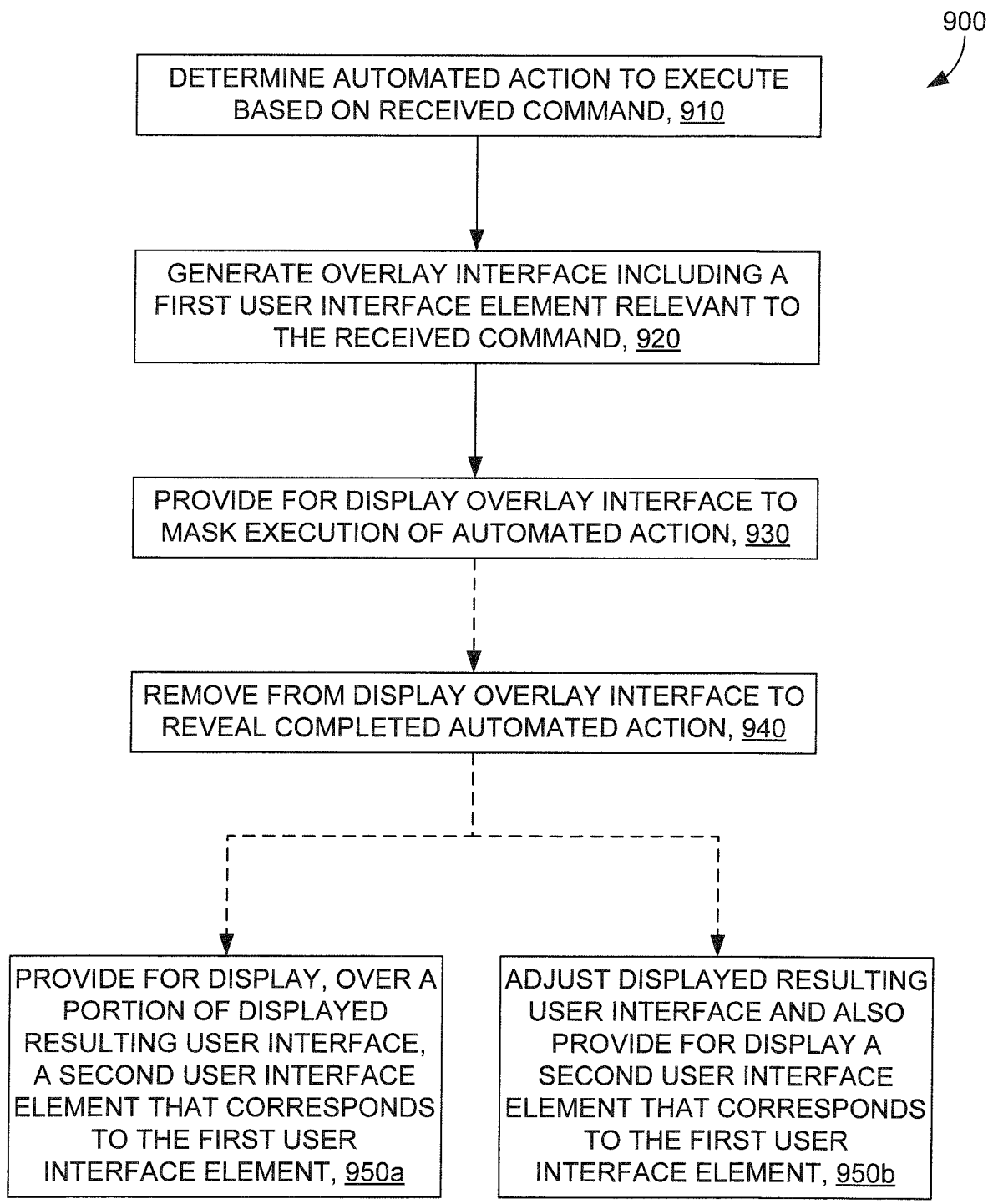
FIG. 9 is a flow diagram showing a method to optimize display engagement in automated action execution in accordance with some embodiments of the present disclosure.

Turning now to FIG. 9, a flow diagram 900 is provided to illustrate a method for optimizing display engagement in action automation. As shown at block 910, a digital assistant, such as digital assistant 114 of FIGS. 1 and 2 executing on a client such as client 110 of FIGS. 1 and 2, determines an automated action to be executed based on a received command. The command is received based on a speech input received via a microphone and converted to a string of text, by speech-to-text component 220 for instance. In some embodiments, the digital assistant can employ contextual data obtained thereby, by contextual data determining component 230 for instance, to determine one of a plurality of predefined commands intended by the received speech input. The digital assistant can then determine one of a plurality of automated actions to execute based on the determined command. In accordance with embodiments described herein, the determined command, after contextual data is considered, can also be referenced herein as the received command. The received command corresponds to a predefined action, which includes a plurality of predefined tasks or operations that the digital assistant can perform on one or more applications to produce a desired result in response to the received command. The digital assistant can employ an automation engine, such as automation engine 240 of FIG. 2, to execute the action in response to the received command.

At block 920, the digital assistant generates an overlay interface, such as overlay interface 640*b* of FIG. 6B or 640*c* of FIG. 6C, that includes one or more user interface elements, such as user interface elements 660, 662, 664, 670 of FIGS. 6B and 6C, determined by the digital assistant as being relevant to the received command. The digital assistant can generate the user interface element(s) to cover at least a portion of the visual data or one or more GUIs generated for display by the application(s) on which the digital assistant is performing tasks or operations on. The digital assistant can employ an action masking component, such as action masking component 250, to generate the overlay interface and user interface elements included thereon. Among other things, the action masking component of the digital assistant can determine one or more user interface elements to include in the overlay interface to present information that is relevant and useful to a user, based on one or more portions of the received command and/or contextual data obtained by the digital assistant.

At block 930, the digital assistant initiates an execution of the automated action using an automation engine, such as automation engine 240 of FIG. 2, and provides for display the overlay interface generated in block 920 using an action masking component, such as action masking component 250 of FIG. 2. As noted, the digital assistant provides for display the overlay interface above any visual data or GUIs associated with the application(s) on which the digital assistant is performing the tasks associated with the automated action. To this end, the overlay interface provides a clean interface that informs a user that the command was received, and also presents additional information based on its determined relevance to the received command and/or obtained contextual data associated with the user and/or device on which the digital assistant is executing. The digital assistant can present the overlay interface for at least a duration that corresponds to the duration corresponding to the action (e.g., from the start of the action to completion thereof).

In further embodiments, at block 940, the digital assistant removes the overlay interface from display to reveal the completed automated action using a post-action managing component, such as post-action managing component 260 of FIG. 2. That is, the visual data or GUIs associated with the applications, on which the digital assistant is performing tasks, are now revealed on the display. As the action is now completed, the final set of visual data or GUI is presented on the display to reveal the desired result based on the action being completed.

In some further embodiments, at block 950*a*, the digital assistant provides for display another user interface element that relates to the user interface included in the overlay interface of block 930. The digital assistant employs a post-action managing component, such as post-action managing component 260 of FIG. 2, to present the other user interface element above the visual data or GUI associated with the application(s) that were hidden by the overlay interface, as depicted in FIG. 8A. In some other embodiments, at block 950*b*, the digital assistant adjusts the visual data or GUI associated with the resulting interface and provides for display adjacent thereto another user interface element that relates to the user interface included in the overlay interface of block 930. The digital assistant employs the post-action managing component, such as post-action managing component 260 of FIG. 2, to present the other user interface element adjacent to the visual data or GUI associated with the application(s) that were hidden by the overlay interface, as depicted in FIG. 8B. In either embodiment described in reference to blocks 950*a* and 950*b*, the digital assistant can detect an interaction (e.g., a touch, tap, click, or other input) corresponding to the other user interface element to conduct another action or provide for display additional relevant information relating to the user interface element(s) that were presented on the overlay interface of block 930.

Figure 10:
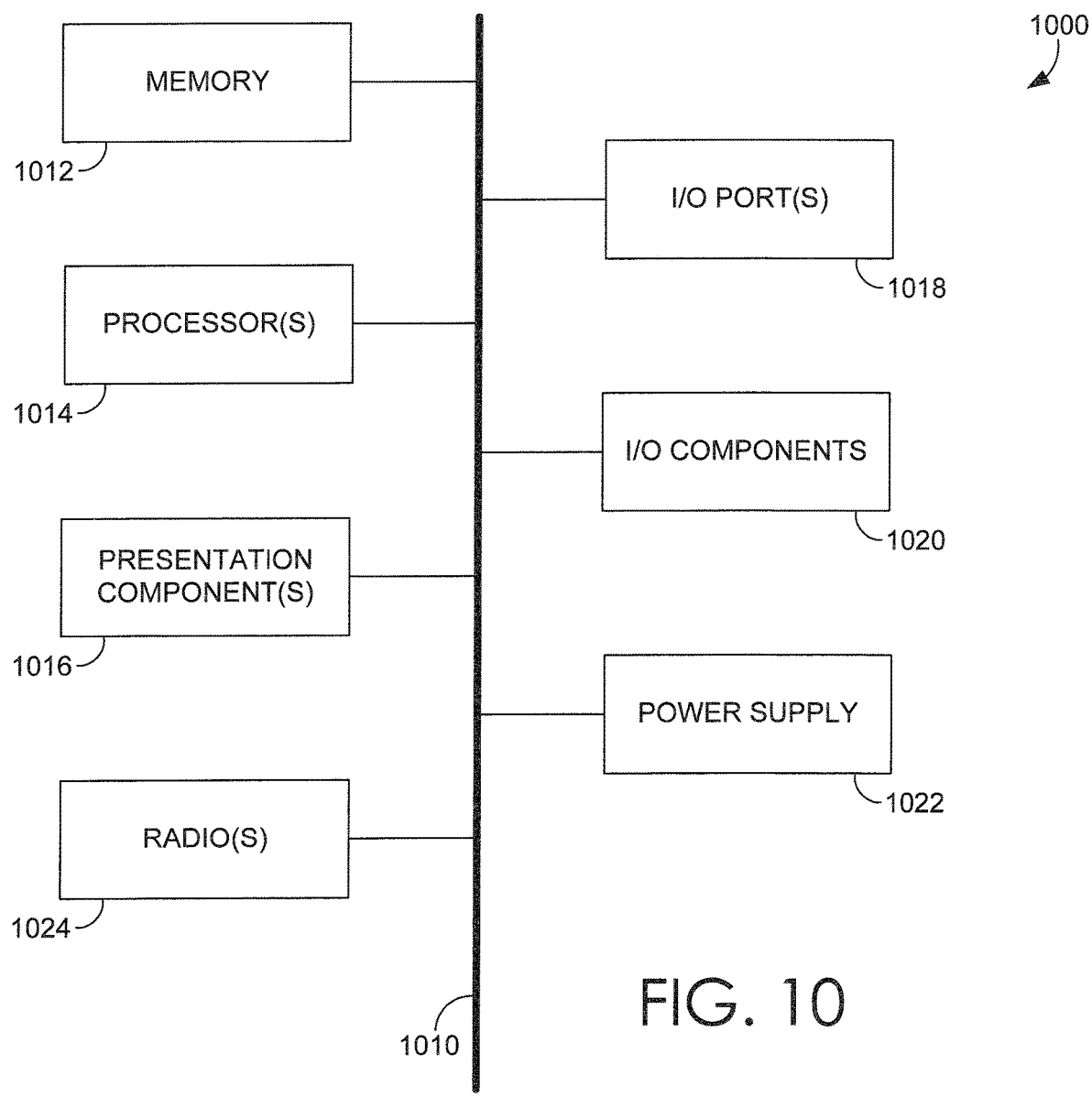
FIG. 10 is a block diagram of an exemplary computing environment suitable for use in implementing some embodiments of the present disclosure.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output (I/O) ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, embodiments of the present invention provide for, among other things, optimizing display engagement in action automation. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:
1. A non-transitory computer storage medium storing computer-useable instructions that, when used by at least one computing device, cause the at least one computing device to perform operations to optimize display engagement in action automation, comprising:

obtaining a library that includes a plurality of commands, each command in the plurality of commands being associated with one of a stored plurality of action datasets, each action dataset in the stored plurality of action datasets defining a corresponding plurality of automated operations to perform utilizing a corresponding application installed on a computing device;

selecting a first action dataset of the stored plurality of action datasets based at least in part on a received command determined to correspond to a first command of the plurality of commands, wherein the selected first action dataset defines a first plurality of automated operations for a first application installed on the computing device;

generating an overlay interface that includes at least a first user interface element, the first user interface element presenting content that is determined relevant to at least a first portion of the received command;

initiating the selected first action dataset, the initiating causing the defined first plurality of automated operations to be performed utilizing the first application; and responsive to initiating the selected first action dataset, providing for display the generated overlay interface to mask visual output data generated for display via the first application, the generated overlay interface being displayed for at least a latency period associated with the performance of the defined first plurality of automated operations.

2. The non-transitory computer storage medium of claim 1, the operations further comprising:
terminating the performance of the defined first plurality of automated operations responsive to an input received via at least a portion of the displayed overlay interface during the latency period.

3. The non-transitory computer storage medium of claim 1, wherein the content of the first user interface element is determined relevant to at least the first portion of the received command based on a determined contextual relationship there between.

4. The non-transitory computer storage medium of claim 3, wherein the content of the first user interface element includes a piece of third-party content.

5. The non-transitory computer storage medium of claim 3, wherein the content of the first user interface element includes a command suggestion, the received command is a first voice command, and the command suggestion is a text representation of a second voice command.

6. The non-transitory computer storage medium of claim 5, wherein the command suggestion corresponds to one of:
a second action dataset of the stored plurality of action datasets, determined to define one of a second plurality of automated operations for the first application, or
a third action dataset of the stored plurality of action datasets, associated with a second command of the plurality of commands and determined to correspond to at least one of the first portion of the received command or obtained contextual data.

7. The non-transitory computer storage medium of claim 6, wherein the obtained contextual data includes at least one of a second portion of the received command, location data determined by the at least one computing device, a profile associated with the at least one computing device, or historical data associated with the profile.

8. The non-transitory computer storage medium of claim 1, further comprising:
removing, after the latency period, the displayed overlay interface to reveal the first application.

9. The non-transitory computer storage medium of claim 8, further comprising:
based on the displayed overlay interface being removed, providing for display over or adjacent to at least a portion of the first application, a second user interface element having content associated with the first user interface element.

10. The non-transitory computer storage medium of claim 9, further comprising:
receiving an interaction via the displayed second user interface element, wherein the displayed second user interface corresponds to one of a second action dataset of the stored plurality of action datasets, an embedded hyperlink, or an embedded deep link; and
accessing a second plurality of automated operations for a second application defined in the second action dataset, the embedded hyperlink, or the embedded deep link, in response to the received interaction.

11. A computer-implemented method to optimize display engagement in action automation, comprising:
storing, by a computing device, a library that includes a plurality of commands to a memory of the computing device, each command in the plurality of commands being associated with one of a stored plurality of action datasets, each action dataset of the stored plurality of action datasets defining a corresponding plurality of executable operations to automatically execute, when the action dataset is initiated, utilizing a corresponding application installed on the computing device;

selecting, by the computing device, a first action dataset of the stored plurality of action datasets based at least in part on a received command determined to correspond to a first command of the plurality of commands, wherein the selected first action dataset defines a first plurality of executable operations for a first application installed on the computing device;

generating, by the computing device, an overlay interface that includes at least a first user interface element, the first user interface element presenting content determined to be contextually relevant to at least a first portion of the received command;

initiating, by the computing device, the selected first action dataset, the initiating causing the defined first plurality of executable operations to be automatically executed utilizing the first application; and responsive to initiating the selected first action dataset, providing for display, by the computing device, the generated overlay interface to mask visual output data generated for display via the first application, the generated overlay interface being displayed for at least a latency period that corresponds to a duration associated with the defined first plurality of executable operations being automatically executed.

12. The computer-implemented method of claim 11, wherein a plurality of executable operations includes at least one of a touch event, a deep link, an inclusion of at least one parameter, or an entry of input data.

13. The computer-implemented method of claim 12, wherein the at least one parameter and the input data is determined based on contextual data obtained by the computing device.

14. The computer-implemented method of claim 13, wherein the obtained contextual data includes at least one of the first portion of the received command, a second portion of the received command, location data determined by the computing device, a profile associated with the computing device, or historical data associated with the profile.

15. A computerized system to optimize display engagement in action automation, comprising:
- at least one processor; and
- at least one computer storage media storing computer-usable instructions that, when used by the at least one processor, cause the at least one processor to:
- obtain a library that includes a plurality of commands, each command in the plurality of commands being associated with one of a stored plurality of action datasets, each action dataset of the stored plurality of action datasets defining a corresponding plurality of automated operations to perform utilizing a corresponding application installed on a computing device;
- select a first action dataset of the stored plurality of action datasets based at least in part on a received command determined corresponding to a first command of the plurality of commands, wherein the selected first action dataset defines a first plurality of automated operations for a first application installed on the computing device;
- generate an overlay interface that includes at least a first user interface element, the first user interface element presenting content determined contextually relevant to at least one parameter included in the received command;
- initiate the selected first action dataset, causing the defined first plurality of automated operations to be performed utilizing the first application; and
- responsive to the selected first action dataset being initiated, provide for display the generated overlay interface to mask visual output data generated for display via the first application, the generated overlay being displayed for at least a latency period that corresponds to the defined first plurality of automated operations being performed.

16. The computerized system of claim 15, wherein the instructions further cause the at least one processor to:
- remove, after the latency period, the displayed overlay interface to reveal resulting visual output data generated for display via the first application based on a completed performance of the defined first plurality of automated operations.

17. The computerized system of claim 15, wherein a plurality of automated operations includes at least one of an emulated touch event, an invocation of a deep link, an automated inclusion of at least one parameter, or an automated entry of input data.

18. The computerized system of claim 15, wherein the command is received based on generated speech-to-text data.

19. The non-transitory computer storage medium of claim 1, wherein the overlay interface is generated based on the selected first action dataset.

20. The non-transitory computer storage medium of claim 1, wherein the generated overlay interface is provided for display to mask an entirety of visual output data generated for display via the first application.

* * * * *